(12) United States Patent
Yakishyn et al.

(10) Patent No.: US 11,262,836 B2
(45) Date of Patent: Mar. 1, 2022

(54) SCREEN CONTROL METHOD AND DEVICE FOR VIRTUAL REALITY SERVICE

(71) Applicant: Samsung Electronics Co., Ltd, Suwon-si (KR)

(72) Inventors: Yevgen Yakishyn, Kyiv (UA); Oleksandra Peteichuk, Tiachivskyi region (UA); Oleksandr Radomskyi, Kharkiv Oblast (UA); Oleksandr Shchur, Kyiv (UA); Sun-Kyung Kim, Busan (KR); Andriy Oliynyk, Kyiv (UA)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/488,534

(22) PCT Filed: Feb. 21, 2018

(86) PCT No.: PCT/KR2018/002117
§ 371 (c)(1),
(2) Date: Aug. 23, 2019

(87) PCT Pub. No.: WO2018/155897
PCT Pub. Date: Aug. 30, 2018

(65) Prior Publication Data
US 2020/0264694 A1 Aug. 20, 2020

(30) Foreign Application Priority Data
Feb. 23, 2017 (KR) .................... 10-2017-0024086

(51) Int. Cl.
*G06F 3/01* (2006.01)
*G06F 3/03* (2006.01)
(Continued)

(52) U.S. Cl.
CPC ............ *G06F 3/011* (2013.01); *G06F 3/0304* (2013.01); *G06F 3/04815* (2013.01); *G06F 3/04842* (2013.01); *G06F 2203/04803* (2013.01)

(58) Field of Classification Search
CPC .......... G06F 2111/18; G06F 3/011–015; G06F 3/0481; G06F 3/04817; G06F 9/4443;
(Continued)

(56) References Cited

U.S. PATENT DOCUMENTS

| 4,574,364 A | 3/1986 | Tabata et al. |
| 5,191,644 A | 3/1993 | Takeda |

(Continued)

FOREIGN PATENT DOCUMENTS

| JP | 2010-198408 A | 9/2010 |
| KR | 10-2012-0000688 A | 1/2012 |

(Continued)

OTHER PUBLICATIONS

Guy Godin, "Virtual Desktop 1.2 Demo", YouTube, https://www.youtube.com/watch?v=kyN2Gj0Q_4g, see reproductior time 00:00-1:50, Dec. 5, 2016.

(Continued)

*Primary Examiner* — Todd Buttram

(57) ABSTRACT

The present disclosure relates to a communication technique, which is a convergence of IoT technology and 5G communication system for supporting higher data transmission rate beyond 4G system, and a system for same. The present invention can be applied to smart services (e.g. smart homes, smart buildings, smart cities, smart cars or connected cars, health care, digital education, retail businesses, security- and safety-related services and the like) on the basis of 5G communication technology and IoT-related technology. The present disclosure, in a screen control method for a (Continued)

(a)

(b)

virtual reality service in an electronic device, comprises the steps of: detecting a movement of a pointer on a screen while an application for a virtual reality service is being executed; analyzing the movement of the pointer on the basis of a preset screen display method; and changing and displaying the configuration of the screen in accordance with the analysis of the movement of the pointer.

14 Claims, 35 Drawing Sheets

(51) Int. Cl.
*G06F 3/0481* (2013.01)
*G06F 3/0484* (2013.01)
*G06F 3/04815* (2022.01)
*G06F 3/04842* (2022.01)

(58) Field of Classification Search
CPC .. G06F 3/04847; G06F 11/3664; G06F 3/012; G06F 3/0304; G06K 9/00664–00704; G06T 19/00; G06T 17/00; G06T 7/00; G06T 19/006; G06T 2215/16; H04N 5/272; H04N 2201/3245; A63F 13/10
See application file for complete search history.

(56) References Cited

U.S. PATENT DOCUMENTS

| | | | |
|---|---|---|---|
| 6,075,531 A | 6/2000 | DeStefano | |
| 6,166,736 A | 12/2000 | Hugh | |
| 6,654,035 B1 | 11/2003 | DeStefano | |
| 7,773,121 B1* | 8/2010 | Huntsberger | H04N 5/2254 348/218.1 |
| 7,844,917 B2 | 11/2010 | Rigolet | |
| 2002/0089546 A1 | 7/2002 | Kanevsky et al. | |
| 2003/0142136 A1 | 7/2003 | Carter et al. | |
| 2007/0180400 A1* | 8/2007 | Zotov | G06F 3/04845 715/788 |
| 2009/0031243 A1 | 1/2009 | Kano et al. | |
| 2011/0320948 A1 | 12/2011 | Choi | |
| 2012/0011588 A1* | 1/2012 | Milener | H04L 63/1425 726/24 |
| 2012/0084717 A1* | 4/2012 | Yao | G06F 3/0481 715/792 |
| 2012/0242692 A1* | 9/2012 | Laubach | G06F 3/04883 345/629 |
| 2012/0302289 A1 | 11/2012 | Kang | |
| 2014/0298252 A1 | 10/2014 | Choi et al. | |
| 2015/0326909 A1* | 11/2015 | Eun | G06F 3/04842 725/38 |
| 2016/0025978 A1 | 1/2016 | Mallinson | |
| 2016/0027214 A1 | 1/2016 | Memmott et al. | |
| 2016/0063766 A1 | 3/2016 | Han et al. | |
| 2016/0170709 A1* | 6/2016 | Jang | H04N 21/4396 715/727 |
| 2016/0196018 A1* | 7/2016 | Lee | G06F 3/04812 715/768 |
| 2017/0228922 A1* | 8/2017 | Kaeser | A63F 13/5255 |
| 2018/0121069 A1* | 5/2018 | DiVerdi | G06F 3/011 |

FOREIGN PATENT DOCUMENTS

| | | |
|---|---|---|
| KR | 10-2012-0132096 A | 12/2012 |
| KR | 10-2013-0129775 A | 11/2013 |
| KR | 10-2014-0120211 A | 10/2014 |

OTHER PUBLICATIONS

International Search Report dated Jun. 5, 2018 in connection with International Patent Application No. PCT/KR2018/002117, 3 pages.
Written Opinion of the International Searching Authority dated Jun. 5, 2018 in connection with International Patent Application No. PCT/KR2018/002117, 6 pages.
Supplementary European Search Report dated Feb. 13, 2020 in connection with European Patent Application No. 18 75 6581, 9 pages.
Notification of the Reasons for Rejection dated Jun. 18, 2021, in connection with Korean Application No. 10-2017-0024086, 9 pages.

* cited by examiner

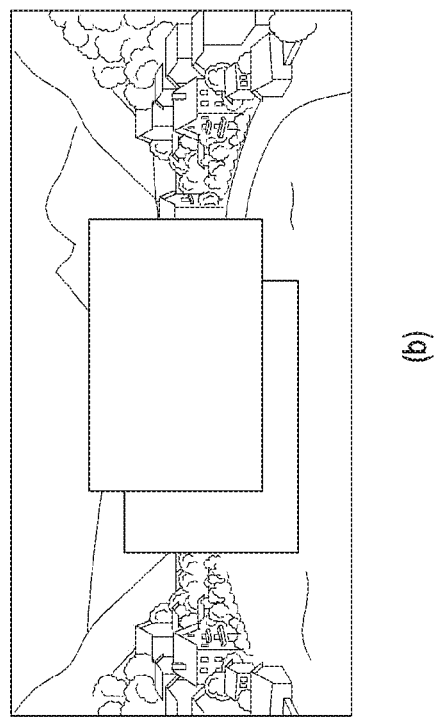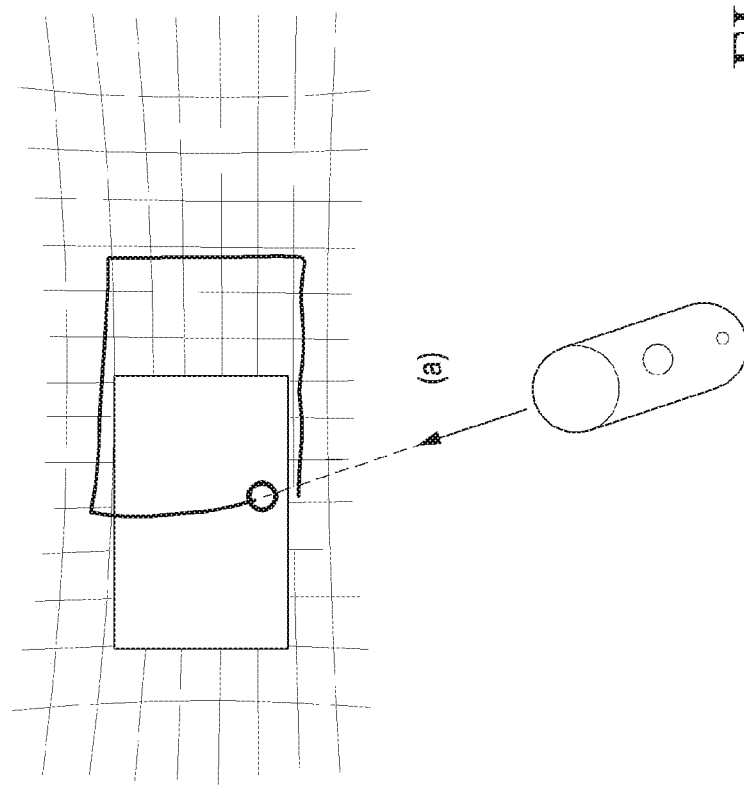
FIG.9

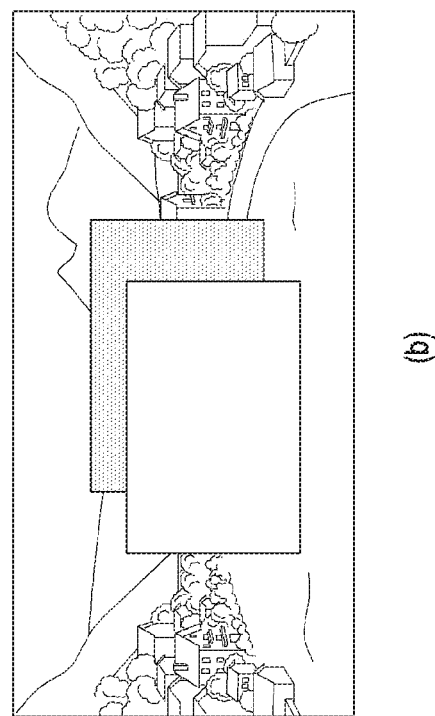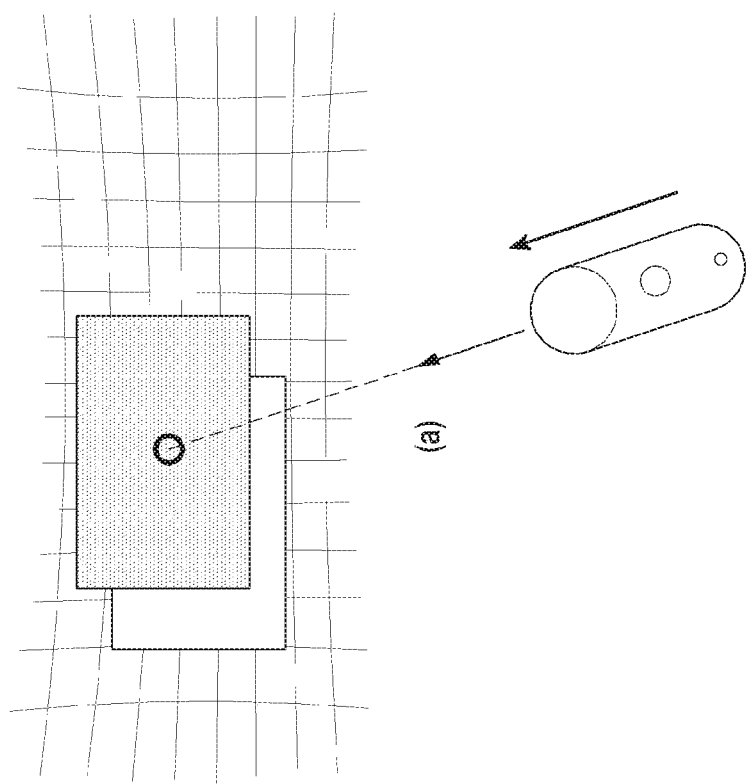
FIG. 10

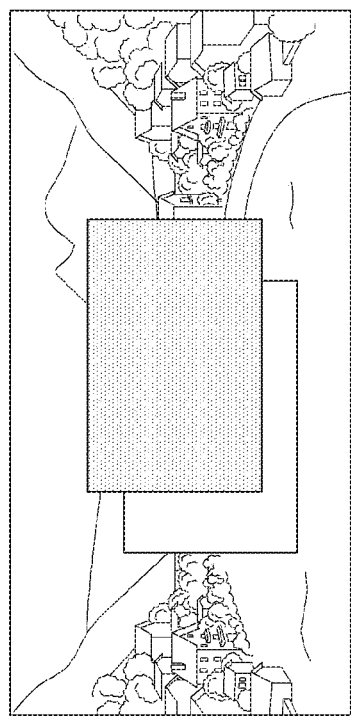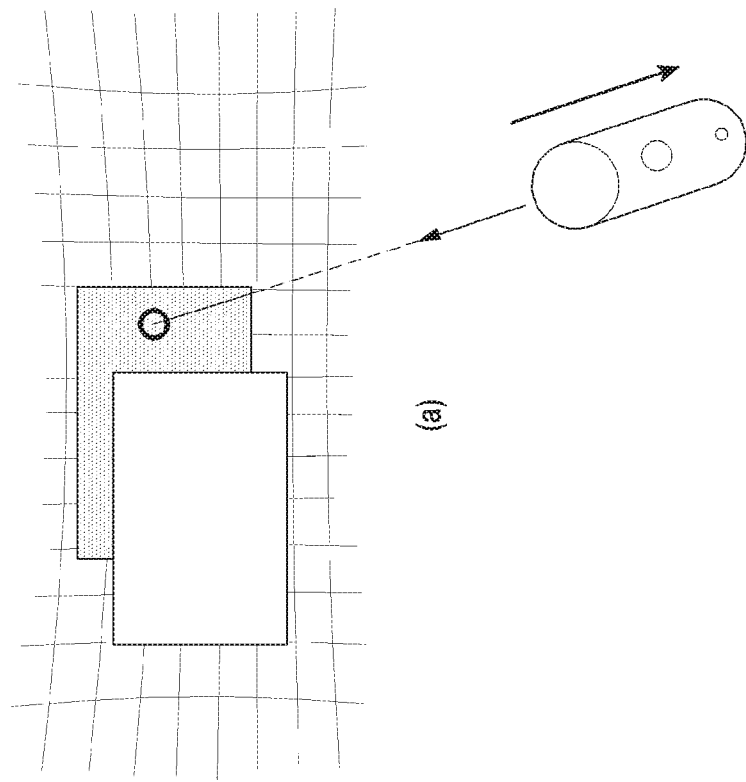
FIG. 11

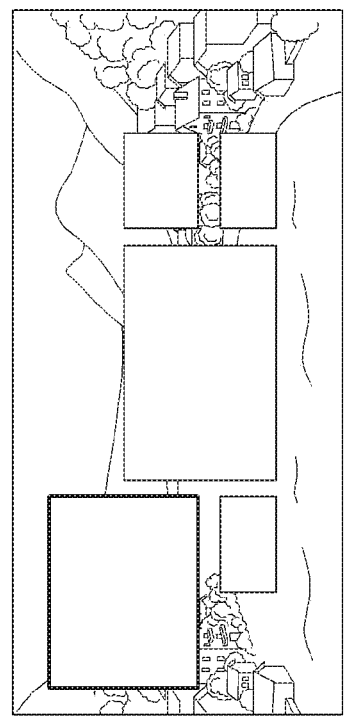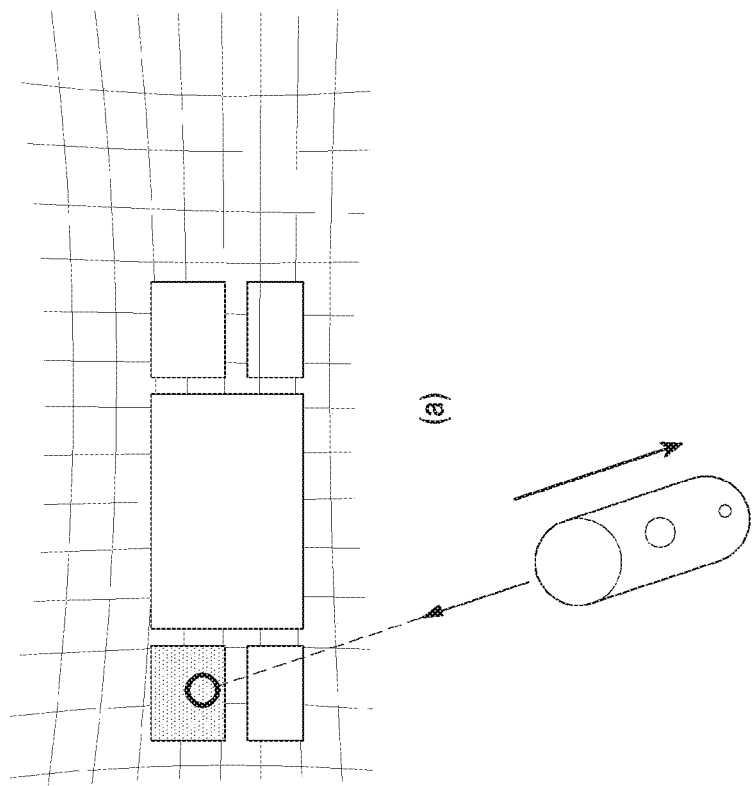
FIG. 12

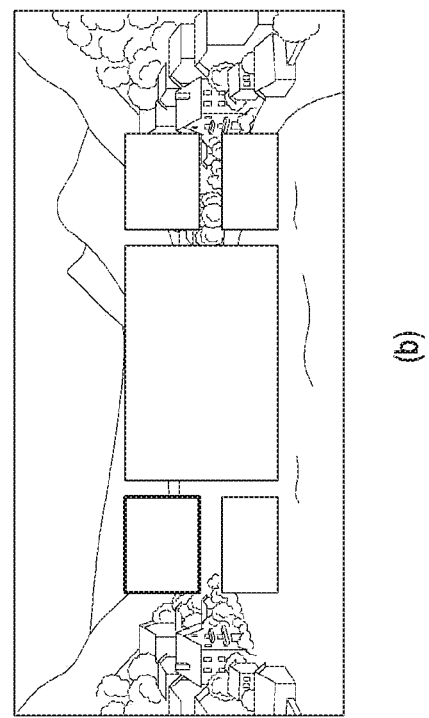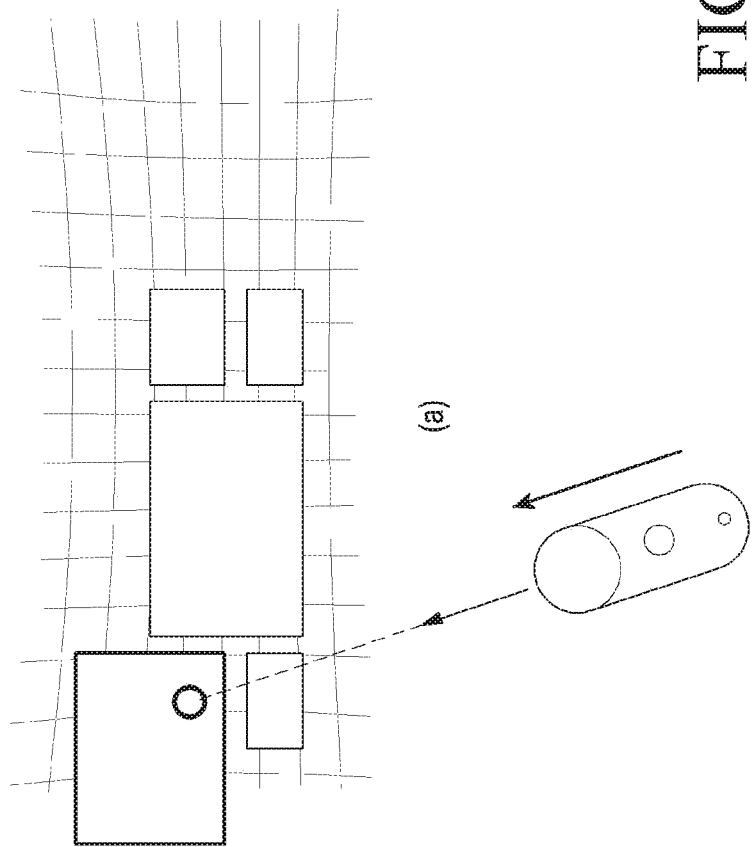
FIG.13

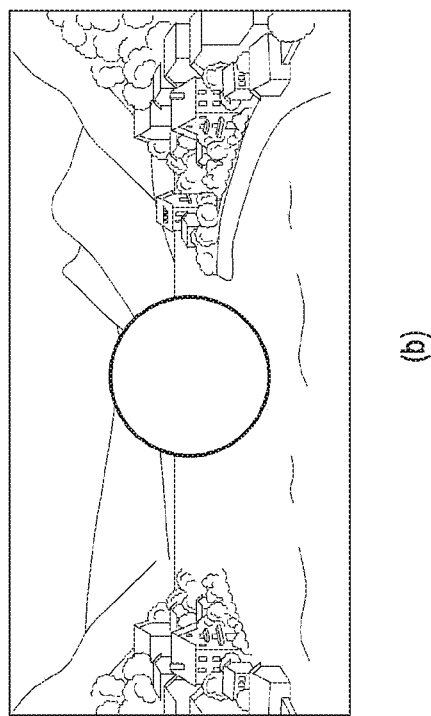
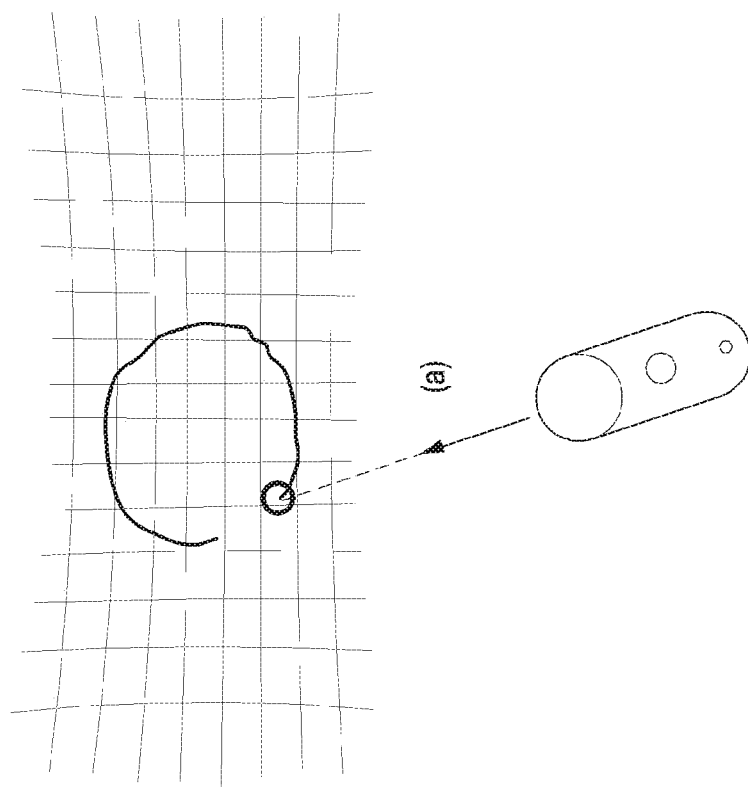
FIG.14

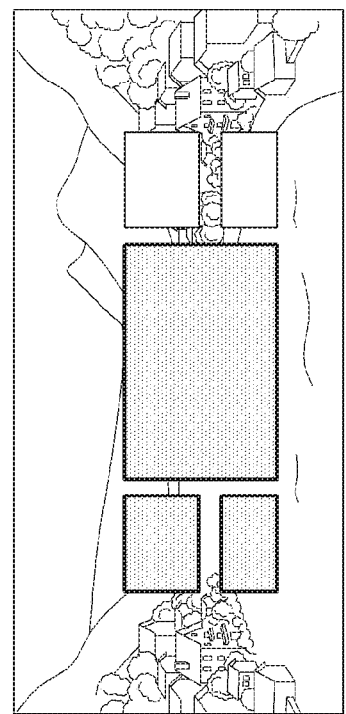
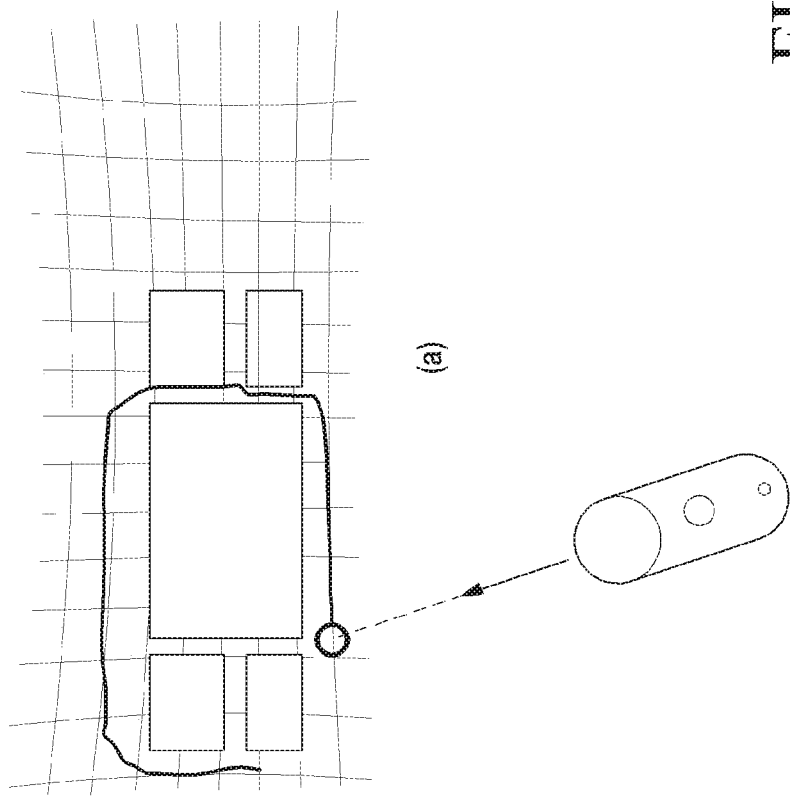
FIG. 15

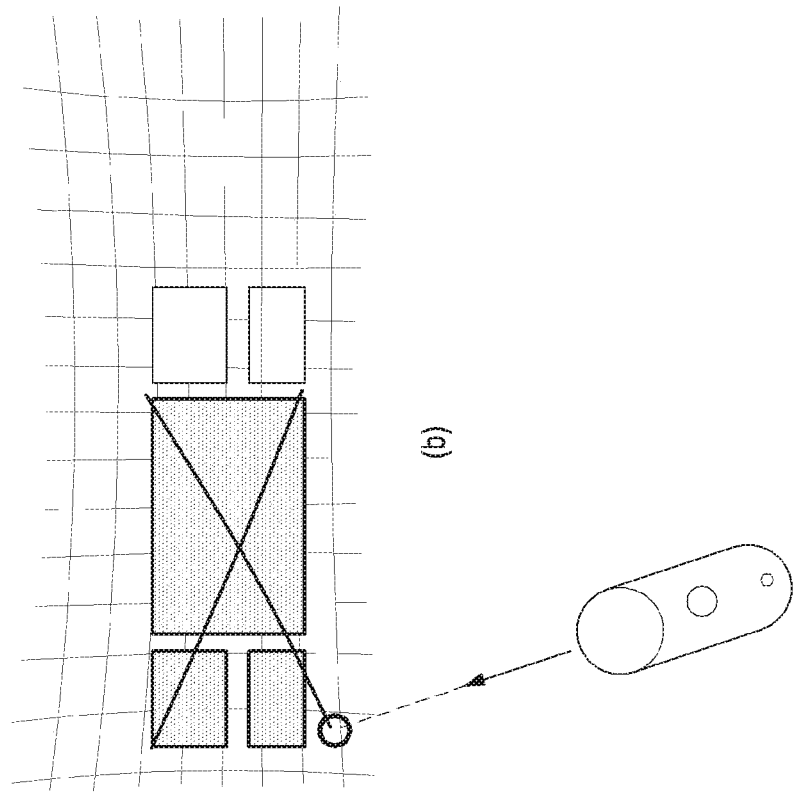
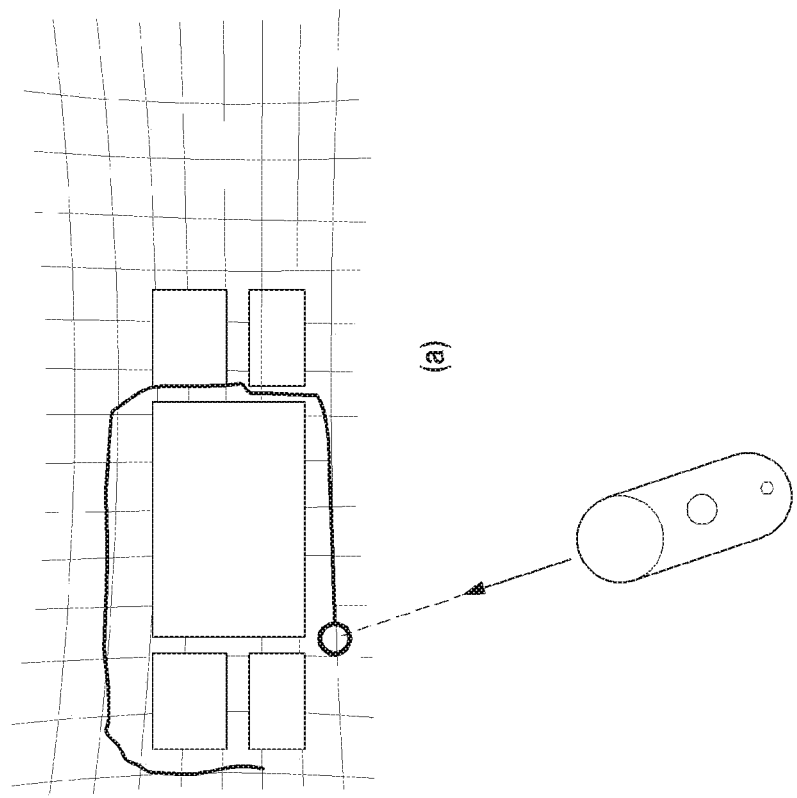
FIG. 16

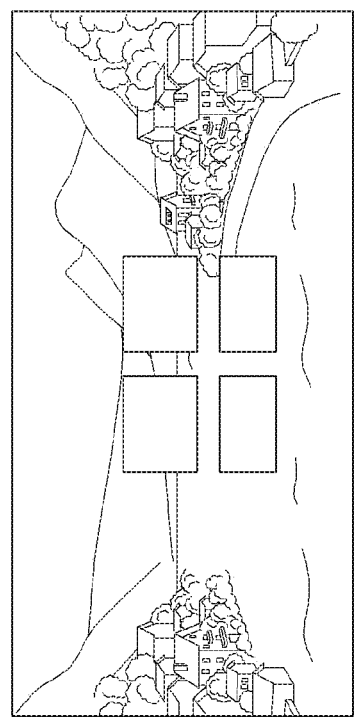
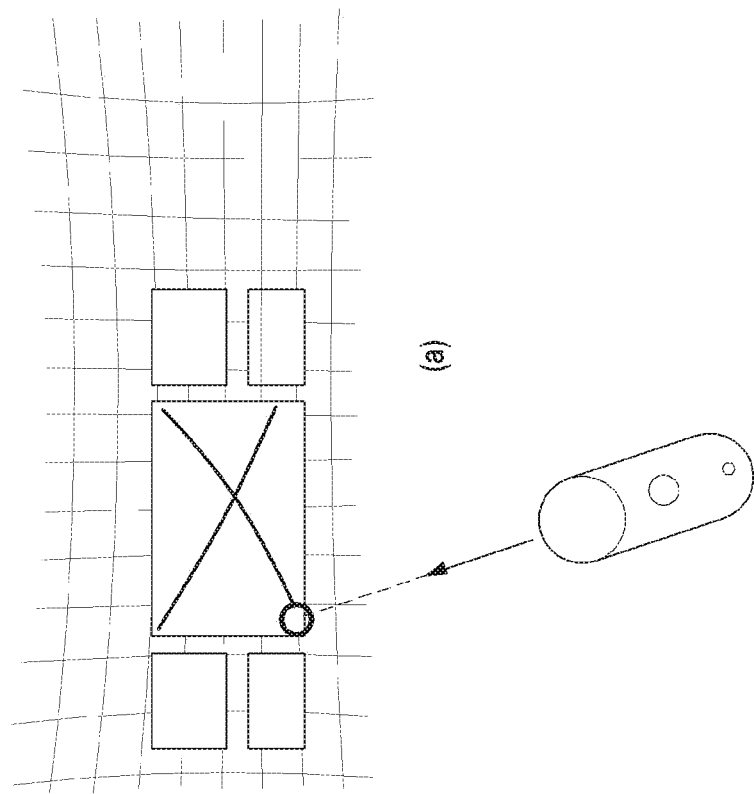
FIG. 17

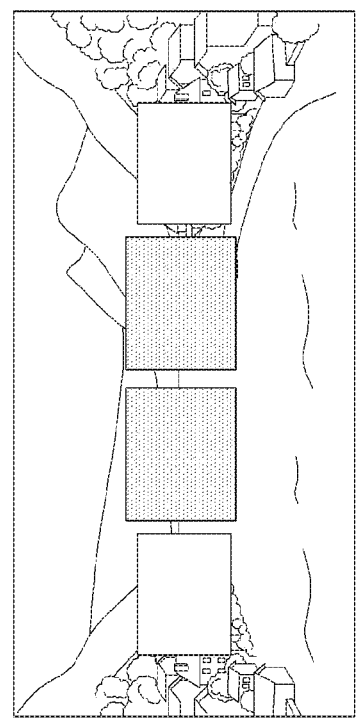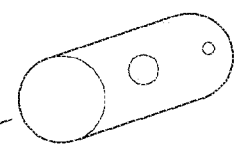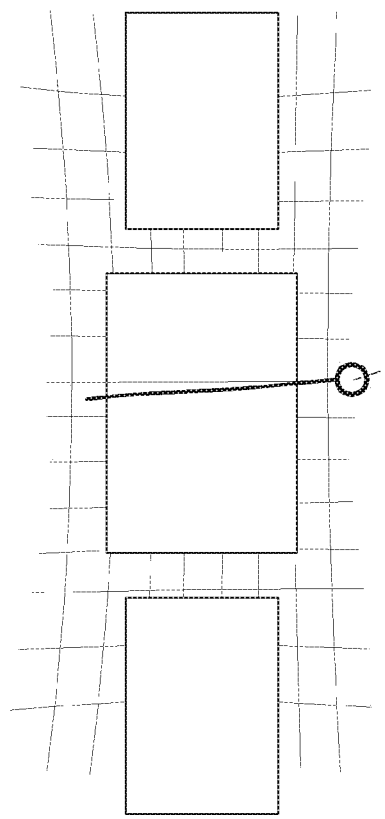
FIG. 18

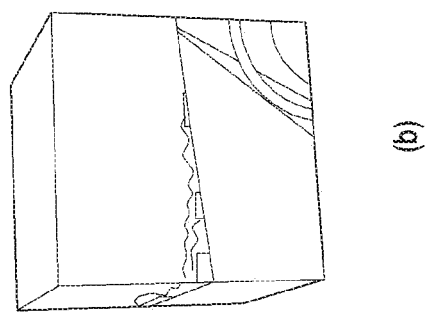
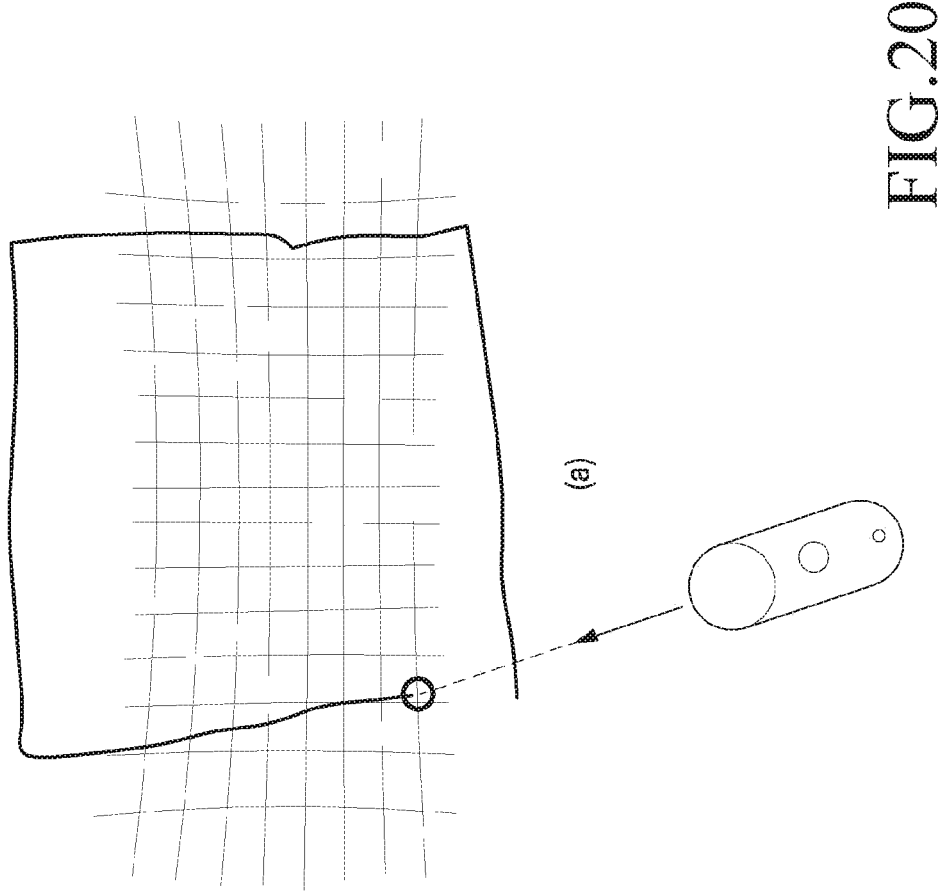
FIG. 20

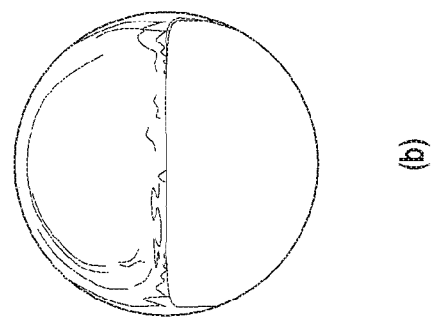
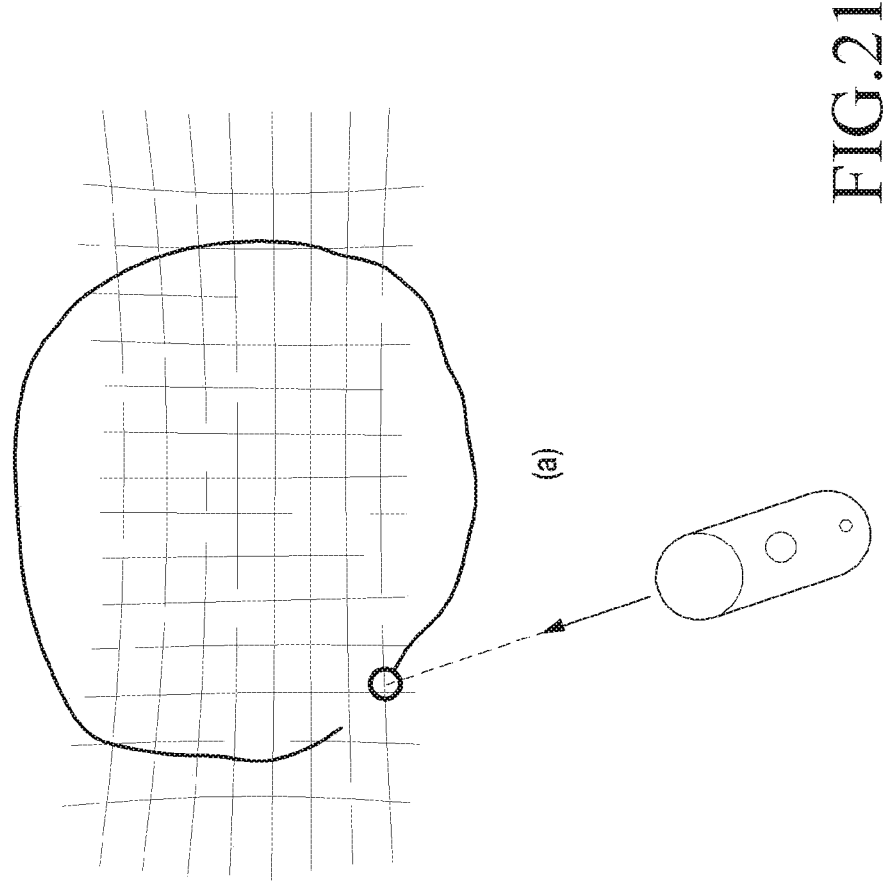
FIG.21

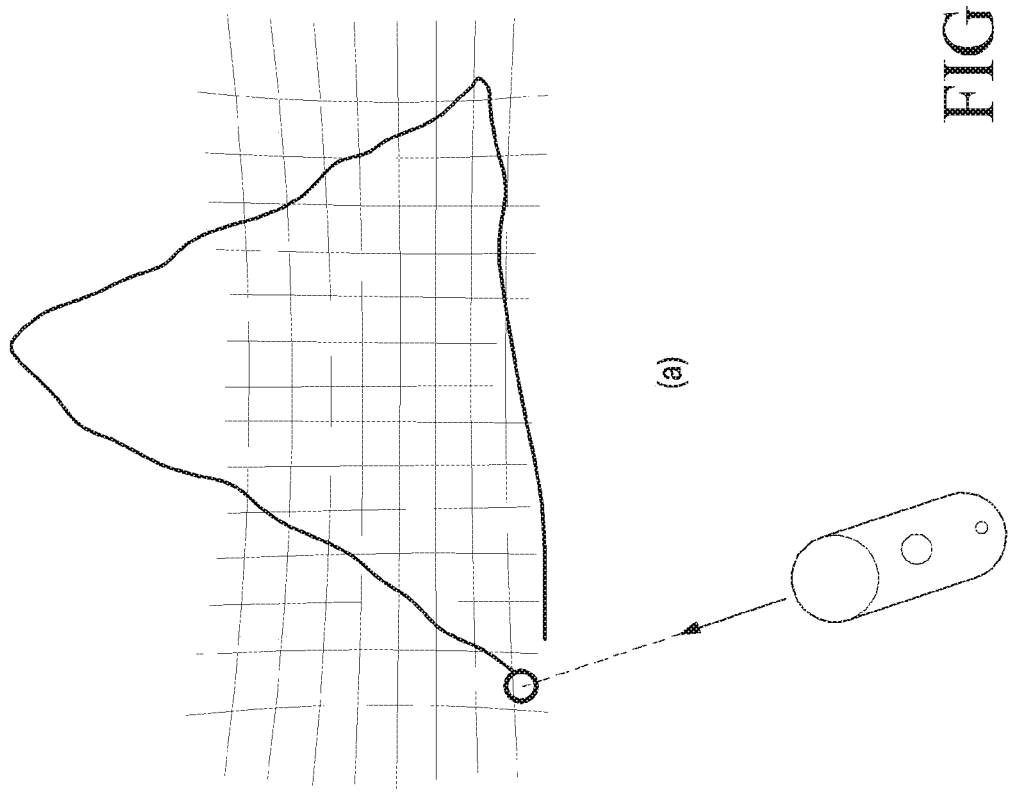
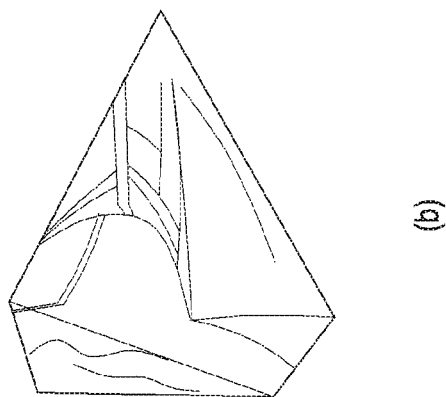
FIG. 22

SCREEN CONTROL METHOD AND DEVICE FOR VIRTUAL REALITY SERVICE

CROSS-REFERENCE TO RELATED APPLICATIONS

This application is a 371 of International Application No. PCT/KR2018/002117 filed on Feb. 21, 2018, which claims priority to Korean Patent Application No. 10-2017-0024086 filed on Feb. 23, 2017, the disclosures of which are herein incorporated by reference in their entirety.

BACKGROUND

1. Field

The disclosure relates to a method and apparatus for configuring and displaying a user screen in a virtual reality (VR) service.

2. Description of Related Art

To satisfy soaring demands for wireless data traffic since commercialization of $4^{th}$-generation (4G) communication systems, efforts have been made to develop improved $5^{th}$-generation (5G) communication systems or pre-5G communication systems. For this reason, the 5G communication system or the pre-5G communication system is also referred to as a beyond-4G-network communication system or a post-long term evolution (LTE) system.

For higher data transmission rates, 5G communication systems are considered to be implemented on ultra-high frequency bands (mmWave), such as, e.g., 60 GHz. In the 5G communication system, beamforming, massive multi-input multi-output (MIMO), full dimensional MIMO (FD-MIMO), an array antenna, analog beamforming, and large-scale antenna technologies have been discussed to alleviate propagation path loss and to increase a propagation distance in the ultra-high frequency band.

For system network improvement, in the 5G communication system, techniques such as an evolved small cell, an advanced small cell, a cloud radio access network (RAN), an ultra-dense network, device to device (D2D) communication, a wireless backhaul, a moving network, cooperative communication, coordinated multi-points (CoMPs), and interference cancellation have been developed.

In the 5G system, advanced coding modulation (ACM) schemes including hybrid frequency-shift keying (FSK) and quadrature amplitude modulation (QAM) modulation (FQAM) and sliding window superposition coding (SWSC), and advanced access schemes including filter bank multi carrier (FBMC), non-orthogonal multiple access (NOMA), and sparse code multiple access (SCMA) have been developed.

The Internet, which is a human-oriented connectivity network where humans generate and consume information, is now evolving into the Internet of Things (IoT), where distributed entities, such as things, exchange and process information. The Internet of Everything (IoE) has also emerged, which is a combination of the IoT technology and the Big Data processing technology through connection with a cloud server.

To meet needs for technology elements, such as sensing technology, wired/wireless communication and network infrastructure, service interface technology, and security technology, for IoT implementation, a sensor network, machine to machine (M2M), machine type communication (MTC), and so forth have been recently researched for connection between things.

Such an IoT environment may provide intelligent Internet technology (IT) services that create new value to human life by collecting and analyzing data generated among connected things. IoT may be applied to a variety of fields including smart homes, smart buildings, smart cities, smart cars or connected cars, smart grids, health care, smart appliances, advanced medical services, and so forth through convergence and combination between existing IT and various industries.

Thus, various attempts have been made to apply 5G communication systems to IoT networks. For example, 5G communication such as a sensor network, M2M, MTC, etc., has been implemented by a scheme such as beamforming, MIMO, an array antenna, and so forth. Application of the cloud RAN as the Big Data processing technology may also be an example of convergence of the 5G technology and the IoT technology.

As massive investments have been recently made by operators in virtual reality (VR) services, extension thereof to a next-generation representative service is expected. Generally, VR may refer to an environment or circumstance similar to a real-life environment as created by computer graphics and mean an interface allowing human beings to feel the VR environment through their sense organs as if they are interacting with the environment in real life. A user may interact with virtual reality in real-time through device manipulation and may have a similar sensory experience to that in the real world.

Augmented reality (AR) refers to a computer graphic technique that combines virtual objects or information with a real-world environment to display the virtual objects as if they were present in the real environment. Such AR is a technique for overlaying a virtual object on a real world seen by a user, and is also called mixed reality (MR) because it merges additional information and a virtual world with a real world in real time to show the merged world as one image.

With the common use of mobile devices (e.g., smartphones, tablet personal computers (PCs), etc.), the VR technique is frequently and easily accessible in various services such as education, gaming, navigation, advertisement, or blogs. Recently, along with commercialization of wearable devices wearable on bodies, research on VR techniques has been actively conducted.

For example, wearable devices have been provided in various forms wearable or removable on or from bodies and clothes, such as a head-mounted type, a glasses type, a watch type, a band type, a contact lens type, a ring type, a shoes type, a clothing type, etc. The wearable devices, such as clothes, glasses, etc., may allow the electronic devices to be worn on bodies, increasing portability and accessibility.

SUMMARY

VR is closely related to a problem of user interface adjustment. When changing or requesting change of a size of windows in VR, the user may have a chance to change a configuration of them. However, a current technique has some limitations in input data and conversion of the input data into interpretable signals for a VR environment. Moreover, according to hitherto technology, there is no possibility to individualize an interface for a particular user in any solutions related to operations of VR user interfaces.

Therefore, the disclosure may propose a system and method for operations and generation of additional elements (more specifically, windows) of a user interface in a VR environment.

The disclosure may also propose a method and apparatus in which a VR user additionally generates a window to assign a desired region in an already-existing window or assign an object/region from a virtual reality environment to additionally give characteristics of the generated window.

According to an embodiment of the disclosure, a method for controlling a screen for a virtual reality (VR) service in an electronic device includes detecting a movement of a pointer on the screen in a state where an application for the VR service is executed, analyzing the movement of the pointer based on a preset screen display method, and changing and displaying a configuration of the screen according to the analysis of the movement of the pointer.

According to an embodiment of the disclosure, an electronic device for controlling a screen for a VR service includes a controller configured to detect a movement of a pointer on the screen in a state where an application for the VR service is executed, to analyze the detected movement of the pointer based on a preset screen display method, and to change a configuration of the screen and display the configuration-changed screen according to the analysis of the movement of the pointer; and a display configured to display the screen under control of the controller.

BRIEF DESCRIPTION OF THE DRAWINGS

FIGS. 9 through 19 illustrate examples of editing windows displayed on a screen by using a pointer, according to the disclosure.

FIGS. 20 through 22 illustrate an example of applying a window editing method to various map solutions, according to the disclosure.

DETAILED DESCRIPTION

Figure 1:
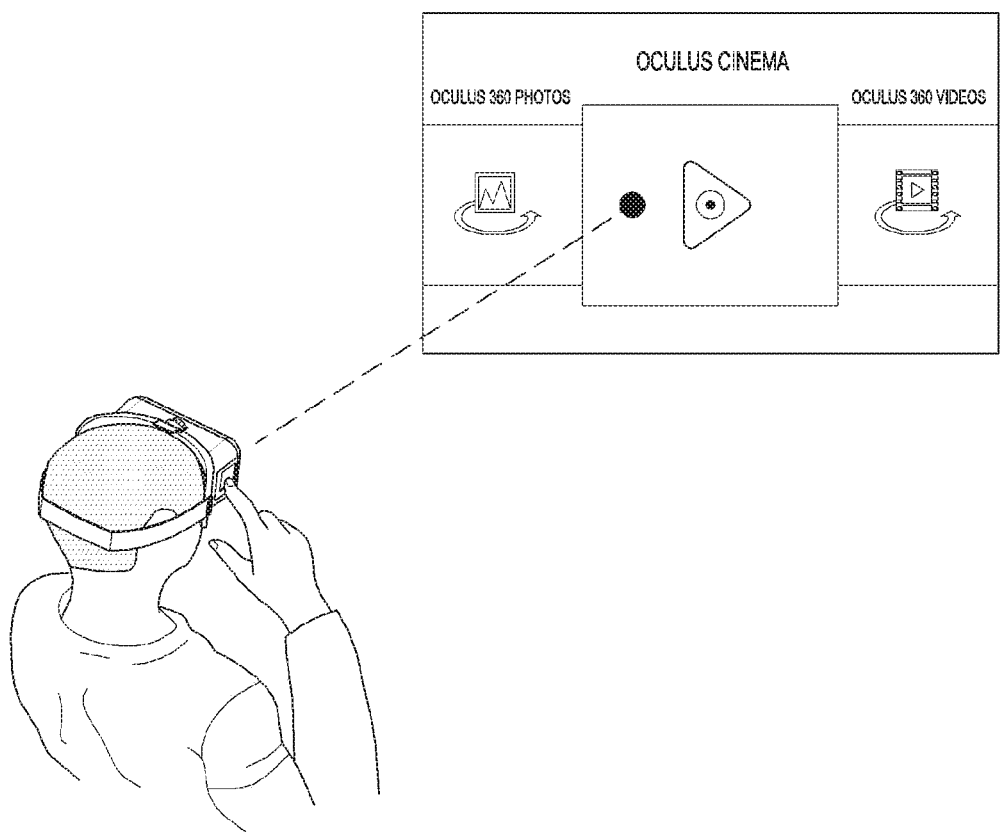
FIG. 1 illustrates an example of gaze direction pointer projection based on positioning sensors mounted on a mobile device or a helmet according to the disclosure.

Hereinafter, various embodiments of the present disclosure will be disclosed with reference to the accompanying drawings. However, the description is not intended to limit the present disclosure to particular embodiments, and it should be construed as including various modifications, equivalents, and/or alternatives according to the embodiments of the present disclosure. With regard to the description of the drawings, similar reference numerals may be used to refer to similar or related elements.

In the present disclosure, an expression such as "having", "may have", "comprising", or "may comprise" indicates existence of a corresponding characteristic (e.g., a numerical value, a function, an operation, or an element like a part) and does not exclude existence of additional characteristic.

In the present disclosure, an expression such as "A or B", "at least one of A or/and B", or "one or more of A or/and B" may include all possible combinations of together listed items. For example, "A or B", "at least one of A and B", or "one or more of A or B" may indicate the entire of (1) including at least one A, (2) including at least one B, or (3) including both at least one A and at least one B.

Expressions such as "first", "second", "primarily", or "secondary", used in various embodiments may represent various elements regardless of order and/or importance and do not limit corresponding elements. The expressions may be used for distinguishing one element from another element. For example, a first user device and a second user device may represent different user devices regardless of order or importance. For example, a first element may be named as a second element without departing from the right scope of the various exemplary embodiments of the present disclosure, and similarly, a second element may be named as a first element.

When it is described that an element (such as a first element) is "operatively or communicatively coupled with/to" or "connected" to another element (such as a second element), the element can be directly connected to the other element or can be connected to the other element through another element (e.g., a third element). However, when it is described that an element (such as a first element) is "directly connected" or "directly coupled" to another element (such as a second element), it means that there is no intermediate element (such as a third element) between the element and the other element.

An expression "configured (or set) to" used in the present disclosure may be replaced with, for example, "suitable for", "having the capacity to", "designed to", "adapted to", "made to", or "capable of" according to a situation. A term "configured (or set) to" does not always mean only "specifically designed to" by hardware. Alternatively, in some situation, an expression "apparatus configured to" may mean that the apparatus "can" operate together with another apparatus or component. For example, a phrase "a processor configured (or set) to perform A, B, and C" may be a dedicated processor (e.g., an embedded processor) for performing a corresponding operation or a generic-purpose processor (such as a CPU or an application processor) that can perform a corresponding operation by executing at least one software program stored at a memory device.

Terms defined in the present disclosure are used for only describing a specific exemplary embodiment and may not have an intention to limit the scope of other exemplary embodiments. It is to be understood that a singular form of a noun corresponding to an item may include one or more of the things, unless the relevant context clearly indicates otherwise. All of the terms used herein including technical or scientific terms have the same meanings as those generally understood by an ordinary skilled person in the related art. The terms defined in a generally used dictionary should be interpreted as having meanings that are the same as or similar with the contextual meanings of the relevant technology and should not be interpreted as having ideal or exaggerated meanings unless they are clearly defined in the various exemplary embodiments. In some cases, terms defined in the present disclosure cannot be analyzed to exclude the present exemplary embodiments.

An electronic device according to various embodiments of the present disclosure may include at least one of a smartphone, a tablet personal computer (PC), a mobile phone, a video phone, an electronic book (e-book) reader, a desktop PC, a laptop PC, a netbook computer, a workstation, a server, a personal digital assistant (PDA), a portable multimedia player (PMP), an MP3 player, a mobile medical appliance, a camera, or a wearable device (e.g., smart glasses, a head-mounted-device (HIVID), electronic clothes, an electronic bracelet, an electronic necklace, an electronic appcessory, electronic tattoos, a smart mirror, or a smart watch).

According to some embodiments, the electronic device may be a smart home appliance. The home appliance may include, for example, a television (TV), a Digital Video Disk (DVD) player, audio equipment, a refrigerator, an air conditioner, a vacuum cleaner, an oven, a microwave oven, a laundry machine, an air cleaner, a set-top box, a home automation control panel, a security control panel, a TV box (e.g., Samsung HomeSync™, Apple TV™, or Google TV™), a game console (e.g., Xbox™, PlayStaion™), an electronic dictionary, an electronic key, a camcorder, or an electronic frame.

According to other embodiments of the present disclosure, the electronic device may include at least one of various medical equipment (e.g., various portable medical measurement devices (a blood glucose meter, a heart rate measuring device, a blood pressure measuring device, a body temperature measuring device, etc.), magnetic resonance angiography (MRA), magnetic resonance imaging (MRI), computed tomography (CT), an imaging device, or an ultrasonic device), a navigation system, a global positioning system (GPS) receiver, an event data recorder (EDR), a flight data recorder (FDR), a vehicle infotainment device, electronic equipment for ships (e.g., a navigation system and gyro compass for ships), avionics, a security device, a vehicle head unit, an industrial or home robot, an automatic teller's machine (ATM), a point of sales (POS), or an Internet of things device (e.g., electric bulbs, various sensors, electricity or gas meters, sprinkler devices, fire alarm devices, thermostats, streetlights, toasters, exercise machines, hot-water tanks, heaters, boilers, and so forth).

According to some embodiments, the electronic device may include a part of furniture or a building/structure, an electronic board, an electronic signature receiving device, a projector, and various measuring instruments (e.g., a water, electricity, gas, or electric wave measuring device, etc.). The electronic device according to various embodiments of the present disclosure may be one of the above-listed devices or a combination thereof. The electronic device according to some embodiments may be a flexible electronic device. The electronic device according to various embodiments of the present disclosure is not limited to the above-listed devices and may include new electronic devices according to technical development.

Hereinafter, a method for configuring and displaying a screen according to various embodiments of the present disclosure will be described with reference to the accompanying drawings. Herein, the term "user" used in various embodiments of the present disclosure may refer to a person who uses the electronic device or a device (e.g., an electronic device having artificial intelligence) using the electronic device. Herein, the term "controller" may mean a control device that accesses a visualization device to implement additional information input and necessary operations with user interfaces. The controller may be regarded as, but not limited to, a joystick, a gamepad, a glove, and other manipulation devices available for implementing information input and/or operations. The term "element" may be understood such that windows are generated by a user under an element in a virtual reality environment for convenience of operations and interface adjustment.

An embodiment of the disclosure provides a method for configuring and displaying a screen for a VR service, in which a user may easily make two-dimensional and three-dimensional (3D) shapes in virtual reality, and create or modify windows and contents on the screen by using a user controlled pointer of a user control type based on a 3D scheme capable of organizing an environment as desired by the user. A window's layout system according to the disclosure may control a window on the screen by integrating the recognition of the window regions and content visualization. The method for configuring and displaying a screen according to the disclosure may be applied to screens regardless of types of the screens, such as screens of various angles (360 degrees, 180 degrees, 110 degrees, etc.) and screens of various sizes (small and medium screens (like PCs, laptops, etc.) and big 2D screens (like video walls, extra-large TVs, etc.).

First, a method for visualizing a pointer positioned on a screen, according to the disclosure will be described.

FIGS. 1 through 6 illustrate examples of visualizing a pointer positioned on a screen, according to the disclosure.

FIG. 1 illustrates an example of visualizing a pointer positioned on a screen by using a mobile device or a VR helmet, according to the disclosure. Referring to FIG. 1, a pointer positioned on a screen may be visualized by projecting a pointer in a gaze direction based on positioning sensors mounted on a mobile device or a helmet.

Figure 2:
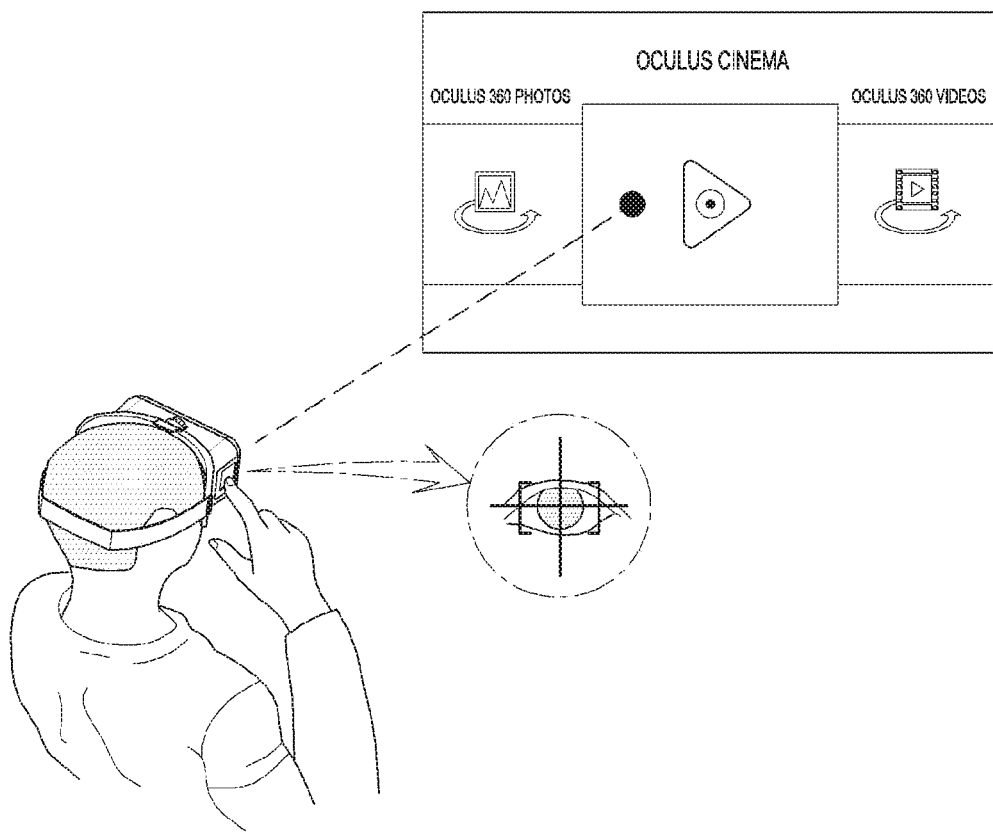
FIG. 2 illustrates an example of recognizing a gaze direction and displaying the gaze direction as a pointer based on eye tracking, based on information sensed from an eye tracking sensor mounted on a helmet, etc., according to the disclosure.

FIG. 2 illustrates an example of visualizing a pointer positioned on a screen based on eye tracking, according to the disclosure. Referring to FIG. 2, a gaze direction may be recognized based on information sensed from an eye tracking sensor mounted on a VR helmet, etc., and may be displayed with a pointer.

Figure 3:
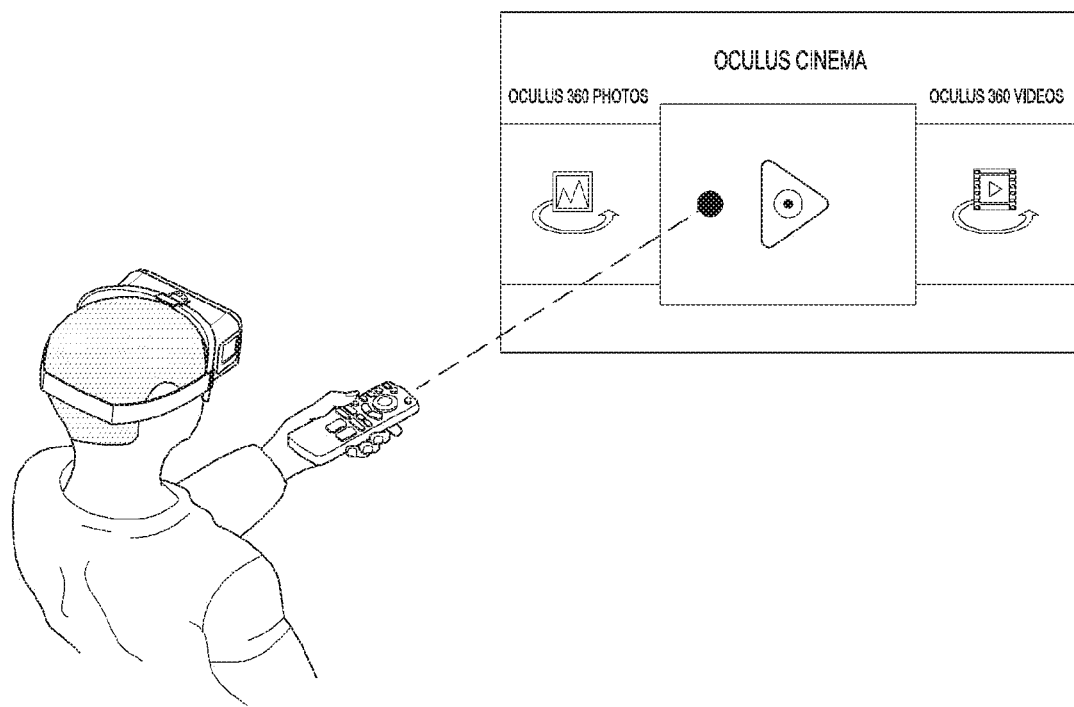
FIG. 3 illustrates an example of recognizing and displaying a position of a pointer based on sensor values obtained from positioning sensors mounted on various separate controllers, according to the disclosure.

FIG. 3 illustrates examples of visualizing a pointer positioned on a screen by using a controller, according to the disclosure. Referring to FIG. 3, a position of a pointer may be recognized and displayed, based on sensor values obtained from positioning sensors mounted on various separate controllers. Although FIG. 3 illustrates an example where a controller communicates with a VR helmet, the controller may display a position of a pointer by communicating with other devices as well as the VR helmet.

Figure 4A:
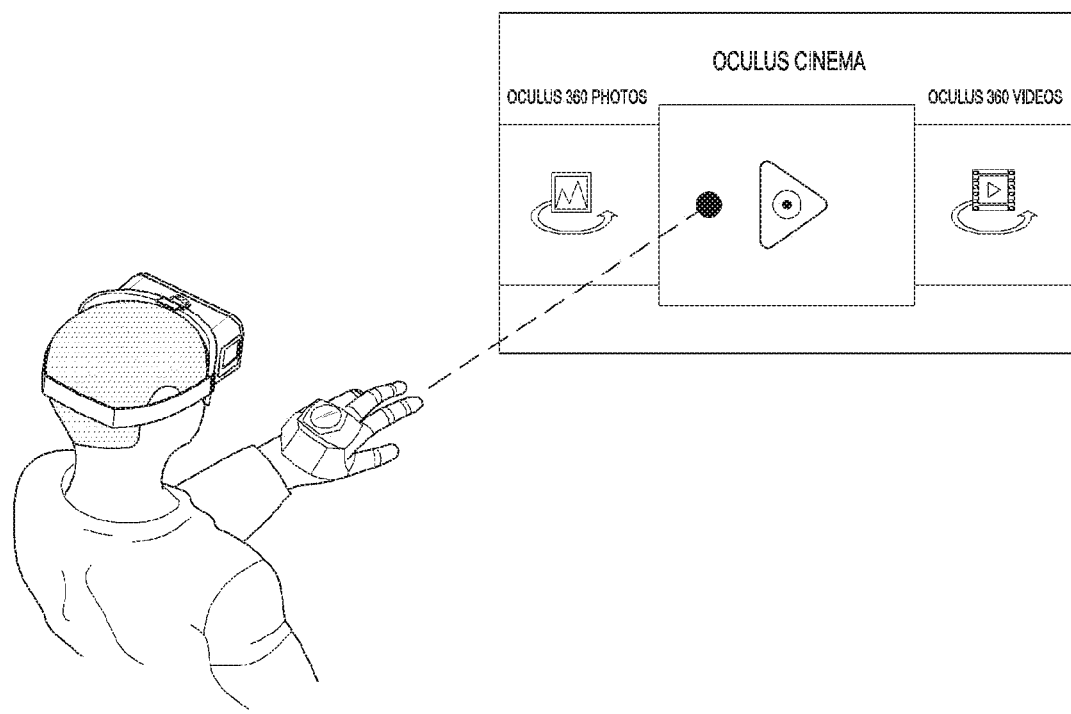
FIGS. 4a and 4b illustrate an example of recognizing and displaying a position of a pointer based on sensor values obtained from sensors mounted on various wearable devices, according to the disclosure.
Figure 4B:
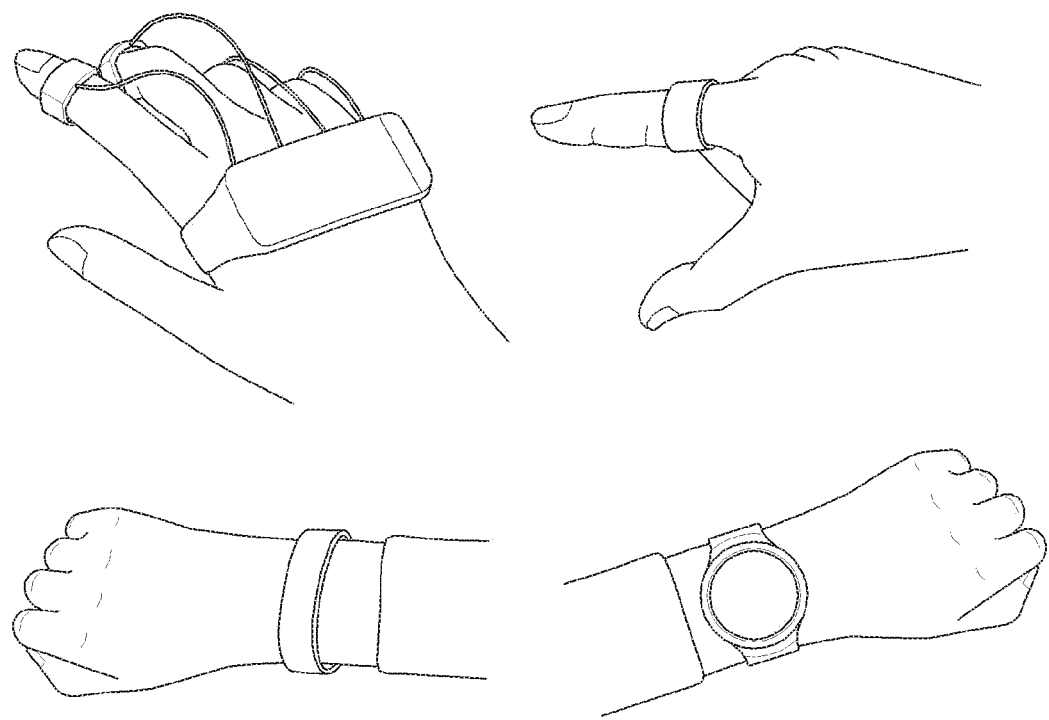

FIGS. 4*a*-4*b* illustrate an example of visualizing a pointer positioned on a screen by using a wearable device, according to the disclosure. Referring to FIG. 4, a position of a pointer may be recognized and displayed, based on sensor values obtained from sensors mounted on various wearable devices. FIG. 4*a* shows a smart glove as an example of a wearable device, and various wearable devices positioned on a hand as well as the smart glove may be used as the controller as shown in FIG. 4*b*.

Figure 5:
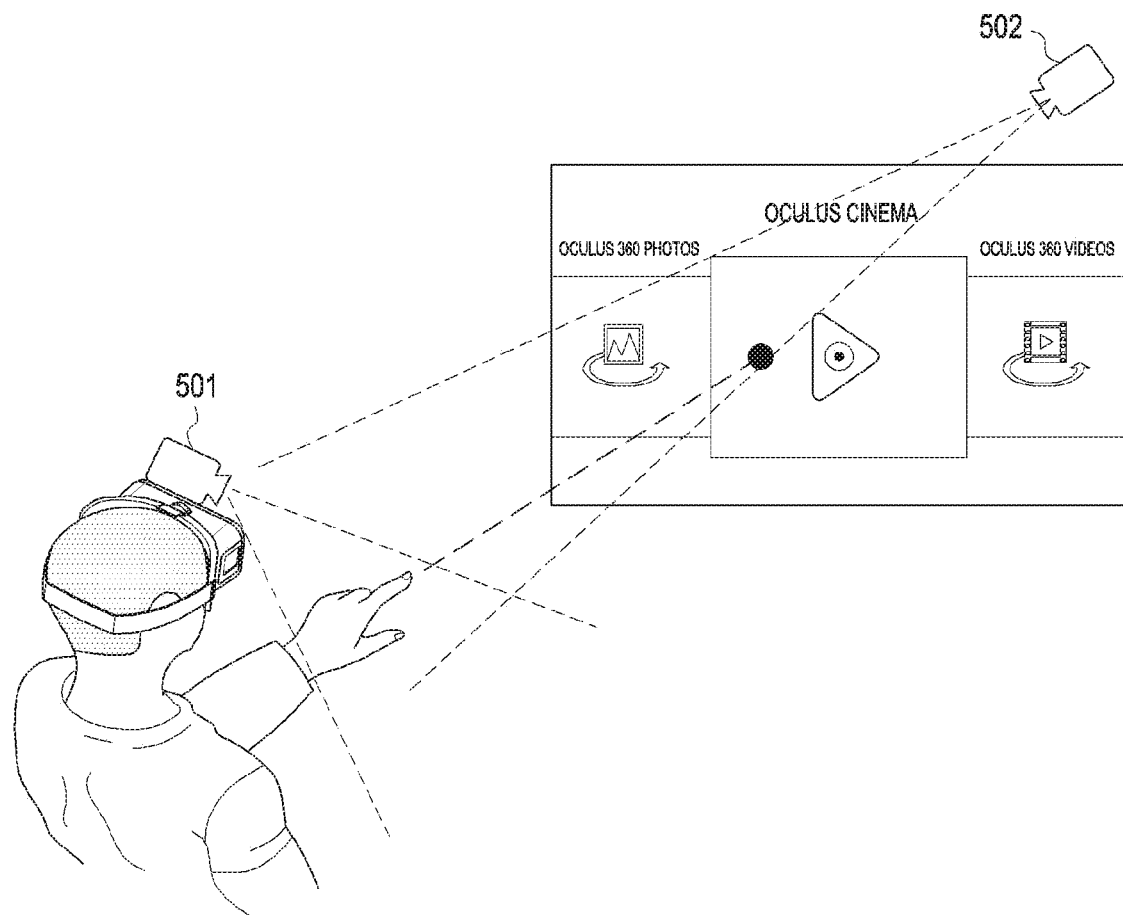
FIG. 5 illustrates an example of recognizing a user's gesture using a camera and displaying a pointer based on the gesture, according to the disclosure.

FIG. 5 illustrates an example of visualizing a pointer positioned on a screen by using a camera, according to the disclosure. Referring to FIG. 5, a user's gesture may be recognized using a camera positioned in front of the user and a camera mounted on the VR helmet, and a pointer positioned on a screen may be displayed based on the recognized user's gesture. In FIG. 5, 501 indicates the camera mounted on the VR helmet, in which the camera is used to recognize a user's gesture and a finger direction, and 502 indicates an external camera communicating with the VR helmet, in which the external camera is used to recognize a user's gesture and a finger direction.

Figure 6:
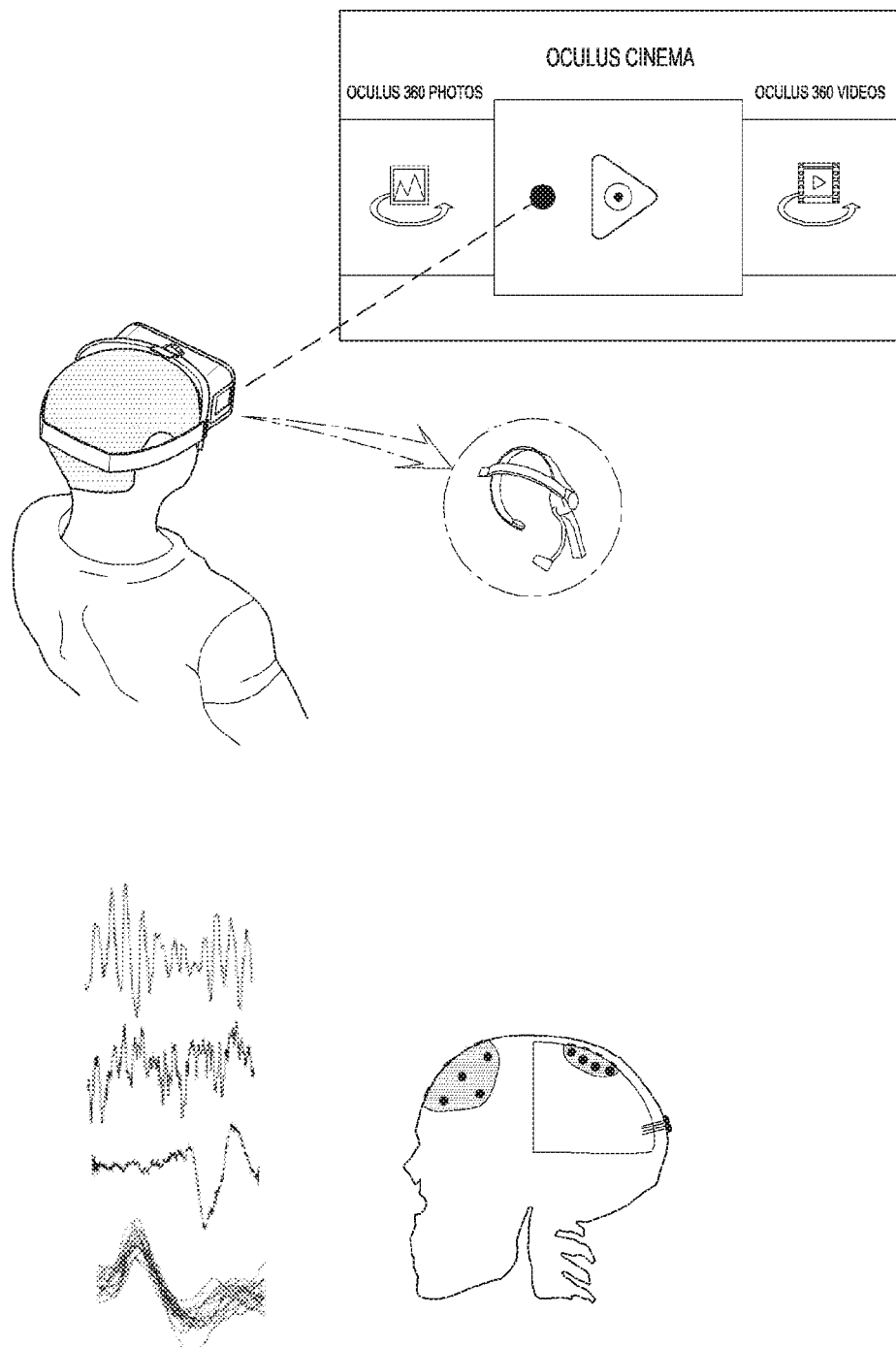
FIG. 6 illustrates an example of displaying a pointer based on a measured brain signal (brainwaves) using a brain sensor, according to the disclosure.

FIG. 6 illustrates an example of visualizing a pointer positioned on a screen by using a brain sensor, according to the disclosure. Referring to FIG. 6, the pointer may be displayed on the screen based on a brain signal (brainwaves) measured through a brain sensor.

Screen display based on pointer recognition according to the disclosure may be implemented in a form where an electronic device (e.g., a portable phone) is docked on or combined with various wearable devices. For example, when a portable phone is mounted on the wearable device in a state where a screen of the portable phone is displayed in a normal mode, the screen of the portable phone may be switched to a VR mode and a screen in the VR mode may be displayed through a display of the wearable device.

Meanwhile, FIGS. 1 through 6 merely illustrate an embodiment of the disclosure, and various methods may be used as a method for recognizing and displaying a pointer according to the disclosure, without being limited to the illustrated embodiment.

According to the disclosure, the user may draw 2D and 3D shapes on an AR/VR, traditional 2D, stereo, full 3D or holography type screen by using the pointer recognized and displayed using various methods described above, and the shapes drawn on the screen may be recognized by the electronic device using various online recognition schemes (e.g., a hidden Markov model method, etc.), and displayed on the screen. When various patterns are drawn using the pointer onto the window displayed on the screen, the pattern may be recognized and applied to the window, such that the window may be changed and displayed.

Next, referring to FIGS. 7 and 8, a method for generating a new window on a screen according to the disclosure will be described.

Figure 7:
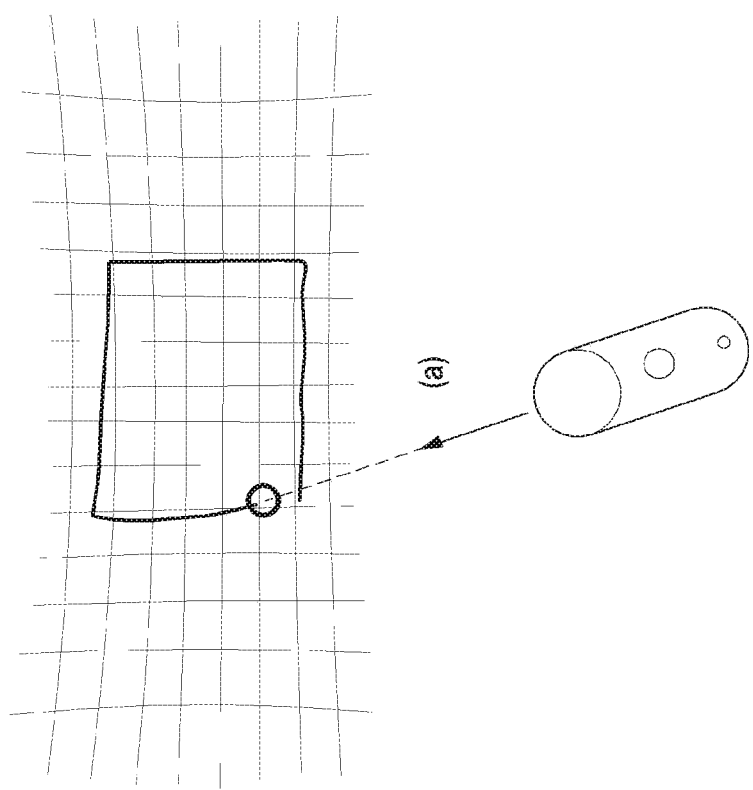
FIGS. 7 and 8 illustrate an example of generating a new window according to the disclosure.

Referring to FIG. 7, once the user draws a rectangular figure using a pointer displayed on a 360-degree screen through the method, etc., illustrated in FIGS. 1 through 6 as in FIG. 7(*a*), the electronic device may recognize the rectangle drawn by movement of the pointer, create and display a rectangular window on the screen as in FIG. 7(*b*).

Figure 8:
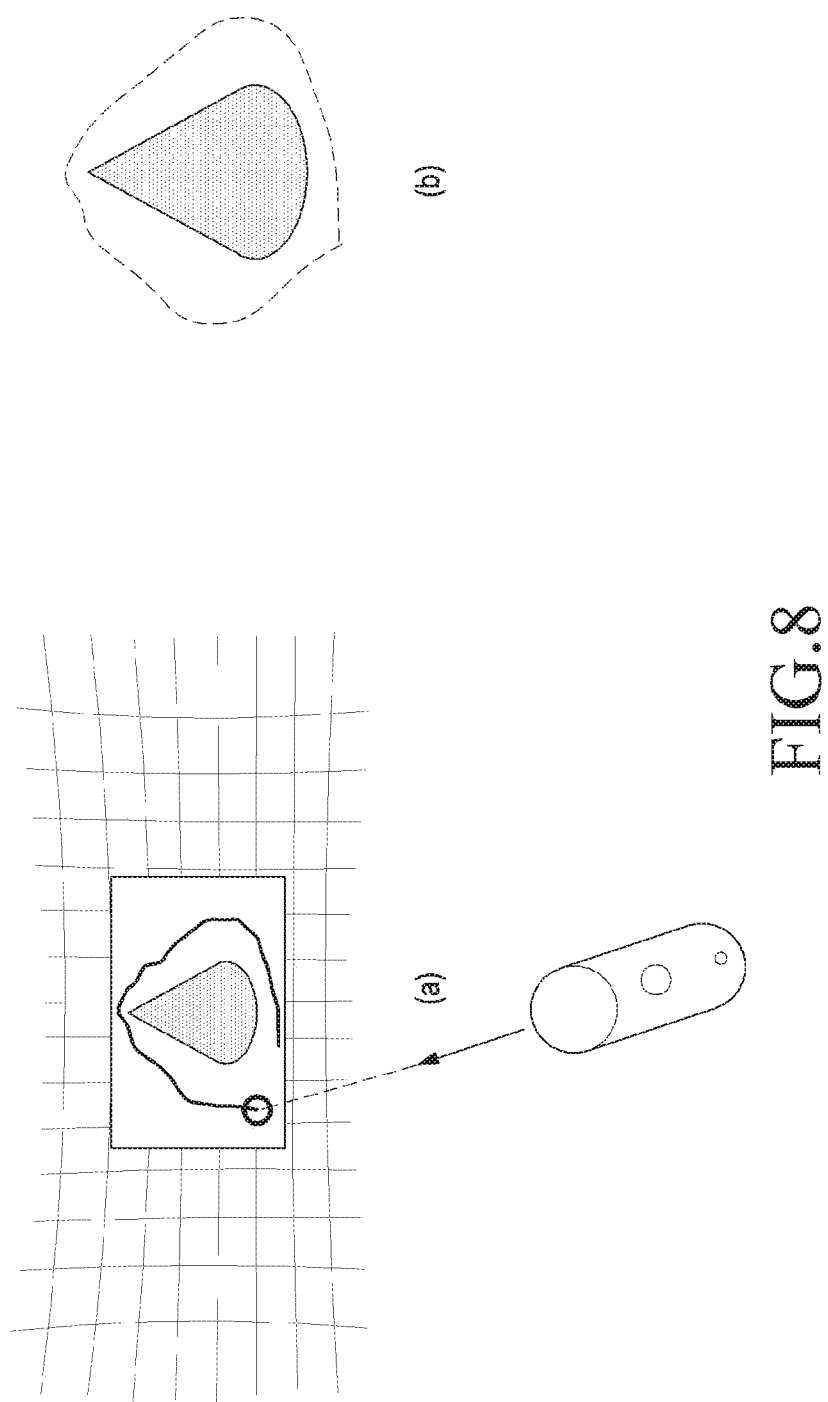

Referring to FIG. 8, once the user draws a circular figure using a pointer displayed on a 360-degree screen through the method, etc., illustrated in FIGS. 1 through 6 as in FIG. 8(*a*), the electronic device may recognize the circle drawn by movement of the pointer, create and display a circular window on the screen as in FIG. 8(*b*).

Although a rectangle and a circle that are 2D figures have been illustrated as examples in FIGS. 7 and 8, the disclosure is not limited thereto, and a 3D figure such as a hexahedron, a sphere, a pyramid, a cone, etc., as well as a 2D figure in various shapes such as a triangle, a polygon, etc., may also be recognized to create and display a window.

FIGS. 9 through 19 illustrate examples of editing windows displayed on a screen by using a pointer, according to the disclosure.

Referring to FIG. 9, once the user draws a line around a target by using a pointer displayed on a 360-degree screen through the method, etc., illustrated in FIGS. 1 through 6 as in FIG. 9(*a*), the electronic device may recognize the line drawn by movement of the pointer, cut the target inside the line from a window screen region, and display the cut region on the screen as in FIG. 9(*b*). In this case, the electronic device may recognize the line drawn by the user using the pointer as a region inside the line, rather than as a figure in a particular shape.

Referring to FIG. 10, in a state where one window is already displayed, once the user draws a rectangle using a pointer displayed on a 360-degree screen through the method, etc., illustrated in FIGS. 1 through 6 as in FIG. 10(*a*), the electronic device may recognize the rectangle drawn by movement of the pointer and display a new rectangular window on the already displayed window as in FIG. 10(*b*).

Referring to FIG. 11, when two windows are overlappingly displayed on the screen, in a state where the user selects a window in front by using a pointer displayed on a 360-degree screen through the method, etc., illustrated in FIGS. 1 through 6, once the user moves the selected window back as in FIG. 11(*a*), the electronic device may recognize movement of the pointer, and move and display the selected window behind the non-selected window as in FIG. 11(*b*).

Referring to FIG. 12, when the two windows are overlappingly displayed on the screen, in a state where the user selects the window in back by using the pointer displayed on the 360-degree screen through the method, etc., illustrated in FIGS. 1 through 6, once the user moves the selected window forward as in FIG. 12(*a*), the electronic device may recognize movement of the pointer, and move and display the selected window in front of the non-selected window as in FIG. 12(*b*).

Referring to FIG. 13, when small and large windows are displayed on the screen, in a state where the user selects a window by using a pointer displayed on a 360-degree screen through the method, etc., illustrated in FIGS. 1 through 6, once the user moves the selected window back by using a controller, etc., as in FIG. 13(*a*), the electronic device may recognize movement of the pointer, enlarge enlarging the size of the selected window, and display the enlarged window as in FIG. 13(*b*).

Referring to FIG. 14, when small and large windows are displayed on the screen, in a state where the user selects a window by using a pointer displayed on a 360-degree screen through the method, etc., illustrated in FIGS. 1 through 6, once the user moves the selected window forward by using a controller, etc., as in FIG. 14(*a*), the electronic device may recognize movement of the pointer, reduce the size of the selected window, and display the reduced window as in FIG. 14(*b*).

Referring to FIG. 15, when several windows are displayed on the screen, once the user draws a line around windows by using a pointer displayed on a 360-degree screen through the method, etc., illustrated in FIGS. 1 through 6 as in FIG. 15(*a*), the electronic device may recognize movement of the pointer and select and display all the windows inside a region indicated by the drawn line as in FIG. 15(*b*).

Referring to FIG. 16, when several windows are displayed on the screen, once the user draws a line around windows by using a pointer displayed on a 360-degree screen through the method, etc., illustrated in FIGS. 1 through 6 as in FIG.

16(*a*), the electronic device may recognize movement of the pointer and select all the windows inside a region indicated by the drawn line, and once the user draws a gesture (e.g., an X mark) for deleting a target on the selected windows by using the pointer, the electronic device may recognize movement of the pointer and then the selected windows disappear from the screen as in FIG. 16(*b*).

Referring to FIG. 17, when several windows are displayed on the screen, once the user draws a gesture (e.g., an X mark) for deleting a target on a window by using a pointer displayed on a 360-degree screen through the method, etc., illustrated in FIGS. 1 through 6 as in FIG. 17(*a*), the electronic device may recognize movement of the pointer and then windows under the gesture disappear from the screen as in FIG. 17(*b*). To provide an option for deleting all windows displayed on the screen, when the user draws a gesture for deleting a target by using a pointer displayed on a 360-degree screen through the method, etc., illustrated in FIGS. 1 through 6, the electronic device may recognize movement of the pointer and display a confirm window for selecting deletion of all windows on the screen.

Referring to FIG. 18, when several windows are displayed on the screen, once the user draws a gesture (e.g., a line drawing gesture) for dividing a target into two pieces on a window by using a pointer displayed on a 360-degree screen through the method, etc., illustrated in FIGS. 1 through 6 as in FIG. 18(*a*), the electronic device may recognize movement of the pointer and then the selected window may be divided into two pieces by the gesture and displayed as separate windows as in FIG. 18(*b*).

Figure 19:
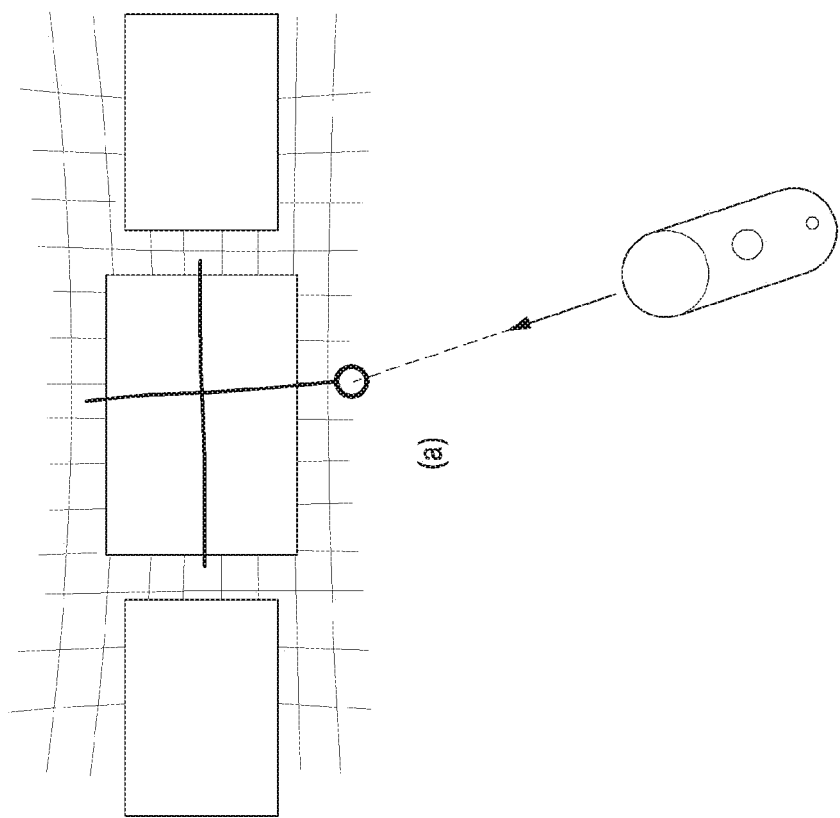

Referring to FIG. 19, when several windows are displayed on the screen, once the user draws a gesture (e.g., a line drawing gesture in a cross shape) for dividing a target into four pieces on a window by using a pointer displayed on a 360-degree screen through the method, etc., illustrated in FIGS. 1 through 6 as in FIG. 19(*a*), the electronic device may recognize movement of the pointer and then the selected window may be divided into four pieces by the gesture and displayed as separate windows as in FIG. 19(*b*).

FIGS. 20 through 22 illustrate an example of applying a window creating and editing method to various map solutions, according to the disclosure.

Referring to FIG. 20, once the user draws a rectangle on a screen using a pointer displayed on a 360-degree screen through the method, etc., illustrated in FIGS. 1 through 6 and switches to a cube map solution through a specific motion as in FIG. 20(*a*), the electronic device may recognize movement of the pointer, change the currently displayed screen into a cube map, and display the cube map as in FIG. 20(*b*).

Referring to FIG. 21, once the user draws a circle on a screen using a pointer displayed on a 360-degree screen through the method, etc., illustrated in FIGS. 1 through 6 and switches to a spherical map solution through a specific motion as in FIG. 21(*a*), the electronic device may recognize movement of the pointer, change the currently displayed screen into a spherical map, and display the spherical map as in FIG. 21(*b*).

Referring to FIG. 22, once the user draws a triangle on a screen using a pointer displayed on a 360-degree screen through the method, etc., illustrated in FIGS. 1 through 6 and switches to a triangle map solution through a specific motion as in FIG. 22(*a*), the electronic device may recognize movement of the pointer, change the currently displayed screen into a triangle map, and display the triangle map as in FIG. 22(*b*).

FIGS. 23*a* through 29*c* illustrate an example of applying a method for editing and displaying a window by using a pointer, according to the disclosure.

Figure 23A:
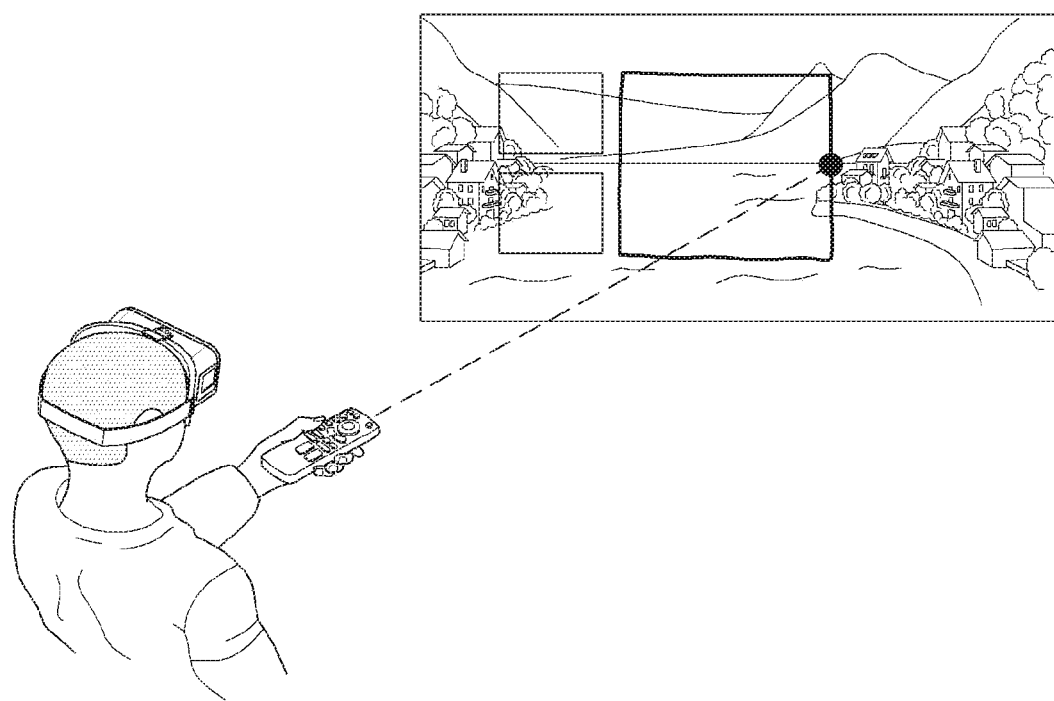
FIGS. 23a through 29c illustrate an example of applying a method for editing and displaying a window by using a pointer, according to the disclosure.
Figure 23B:
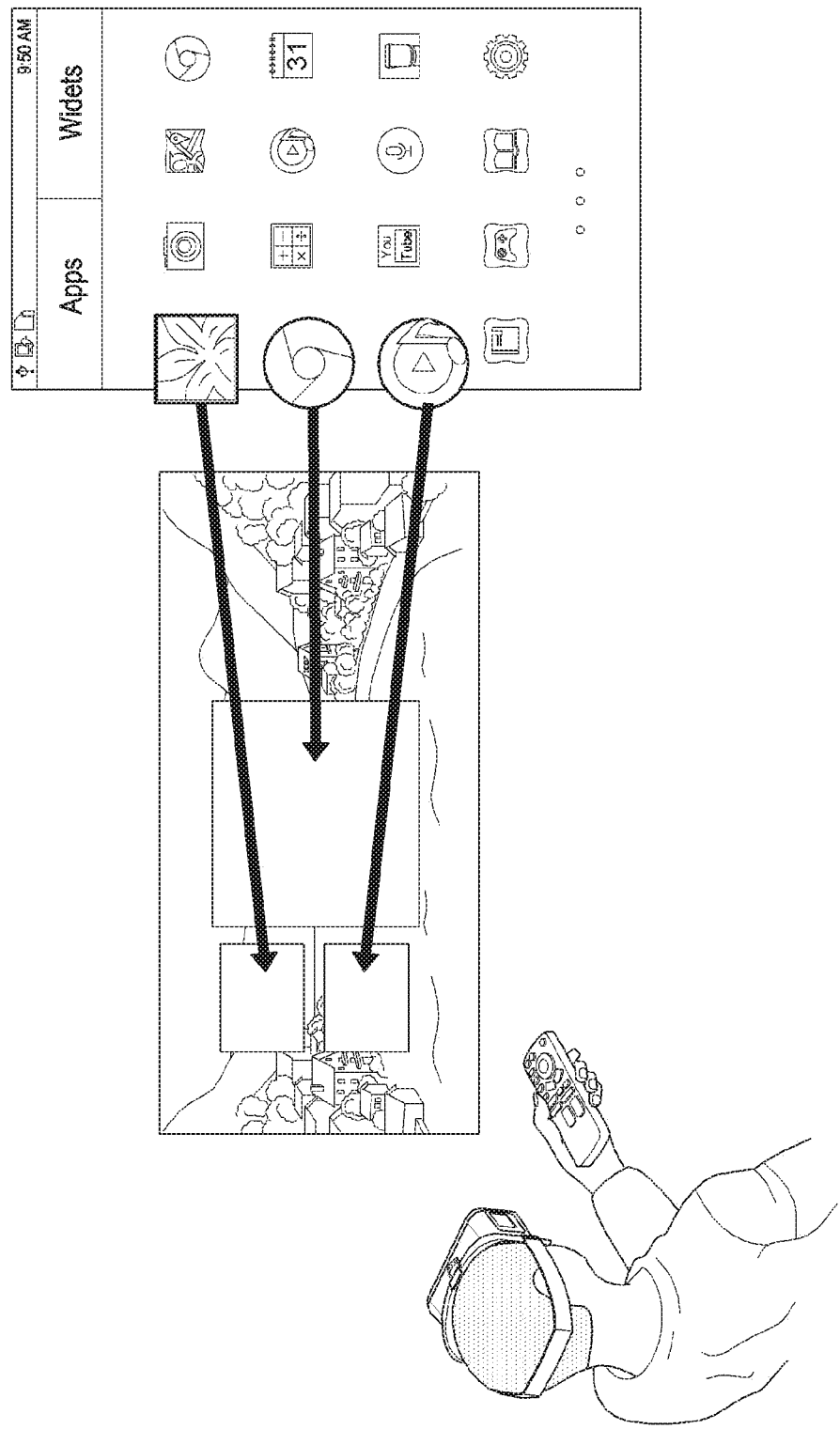
Figure 23C:
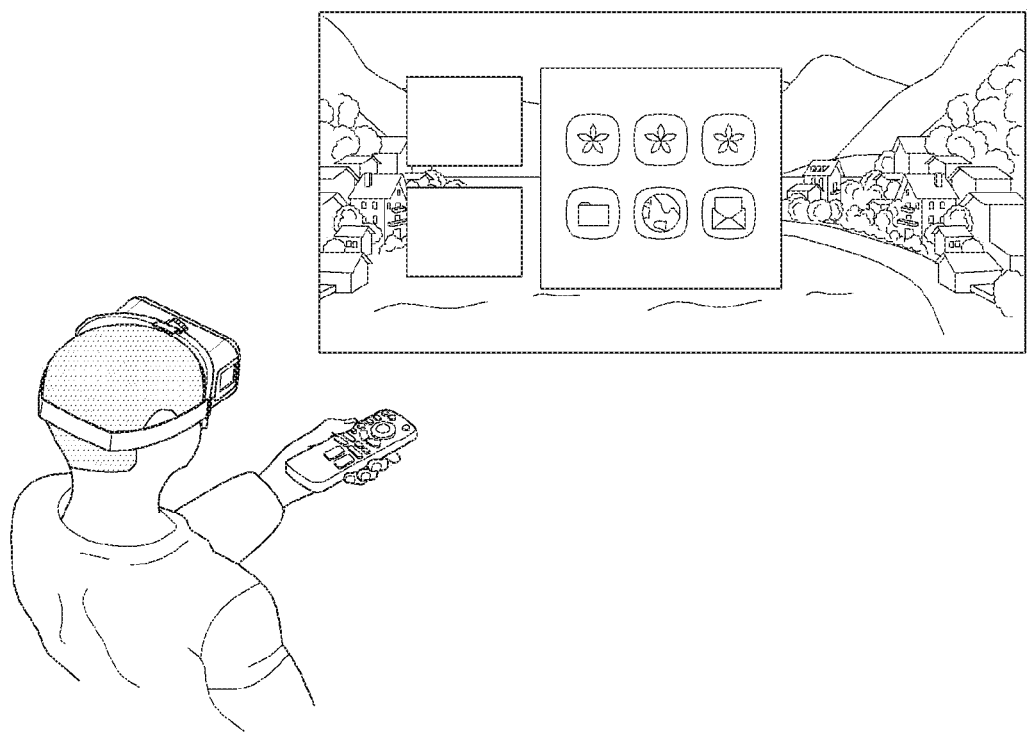

Referring to FIGS. 23*a*-23*c*, the user may establish a layout for a user environment in an easy manner by using a pointer displayed on a 360-degree screen through the method, etc., illustrated in FIGS. 1 through 6, as in FIG. 23*a*. The user then arranges applications of a smartphone or a desktop on each window of the established layout by using the pointer as in FIG. 23*b*. The user may then select and execute the applications by using the pointer displayed on the 360-degree screen through the method, etc., shown in FIGS. 1 through 6, as in FIG. 23*c*.

Figure 24:
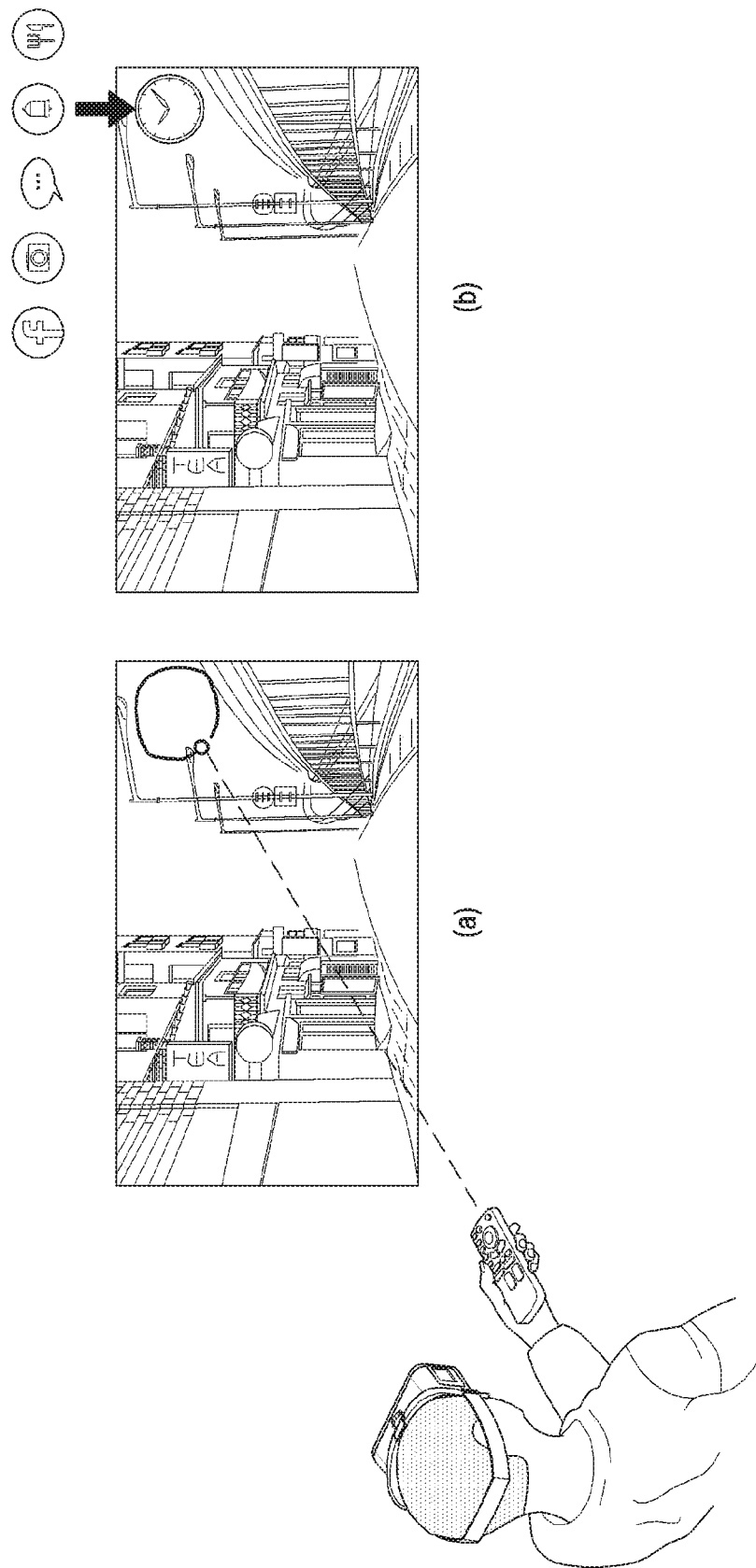

Referring to FIG. 24, the user may create an additional window at a position in a window by using the pointer displayed on the 360-degree screen through the method, etc., illustrated in FIGS. 1 through 6, to obtain a specific notification in an easy and proper way during play of a game, as in FIG. 24(*a*). The user may then select and apply an application for a desired notification to the created window by using the pointer displayed on the 360-degree screen through the method, etc., shown in FIGS. 1 through 6, as in FIG. 24(*b*). FIG. 24 shows an example where a clock application is displayed on a game screen, but various other applications such as Facebook®, a camera application, a text message application, etc., may be selected and displayed on the screen.

Figure 25:
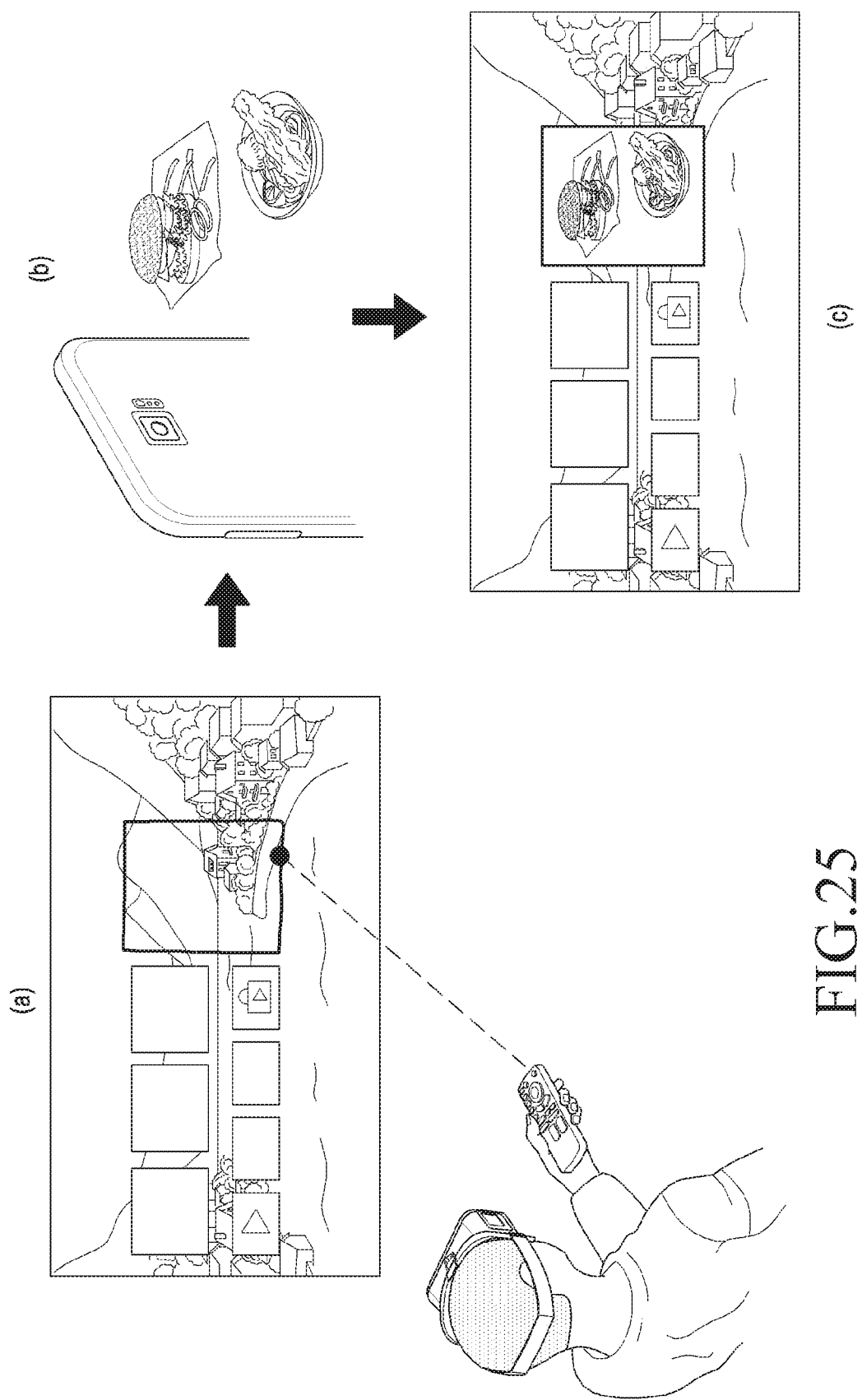

Referring to FIG. 25, the user may create a window by using a pointer displayed on 360-degree screen through the method, etc., illustrated in FIGS. 1 through 6, as in FIG. 25(*a*) to display external virtual reality, etc., on the created window. FIG. 25 shows an example where an external screen is captured using a camera as in FIG. 25(*b*) and the captured image is displayed on the created window as in FIG. 25(*c*).

Figure 26:
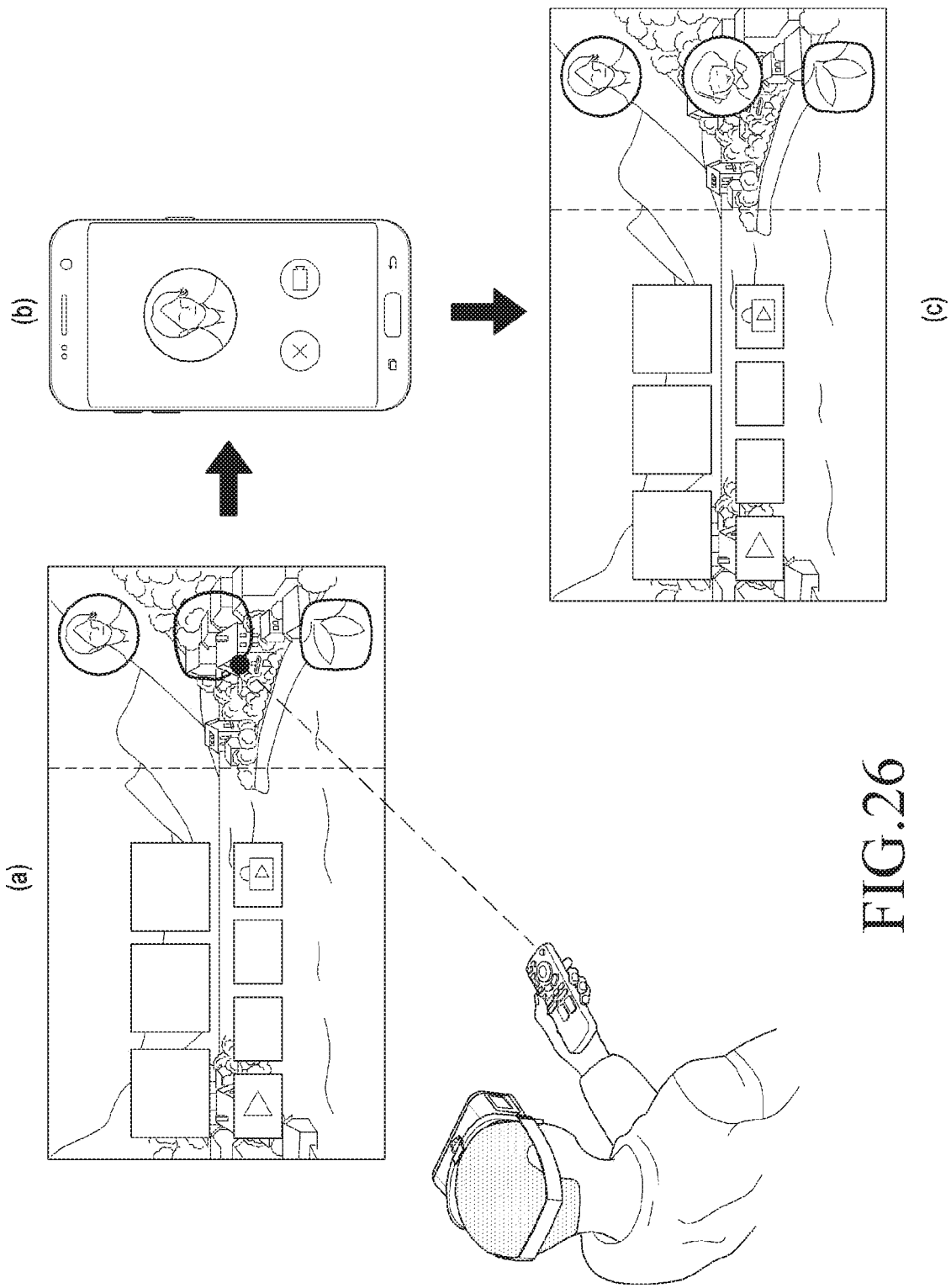

Referring to FIG. 26, the user may set a part of the screen as a preferred menu region such that this region may appear or disappear through various controllers such as a helmet, etc., as in FIG. 26(*a*). In FIG. 26, the user selects contact numbers as a preferred menu by using a pointer displayed on 360-degree screen through the method, etc., illustrated in FIGS. 1 through 6, as in FIG. 26(*b*), and an image indicating user-selected contact numbers or a preset number of contact numbers may be displayed on a preferred menu region as in FIG. 26(*c*).

Figure 27:
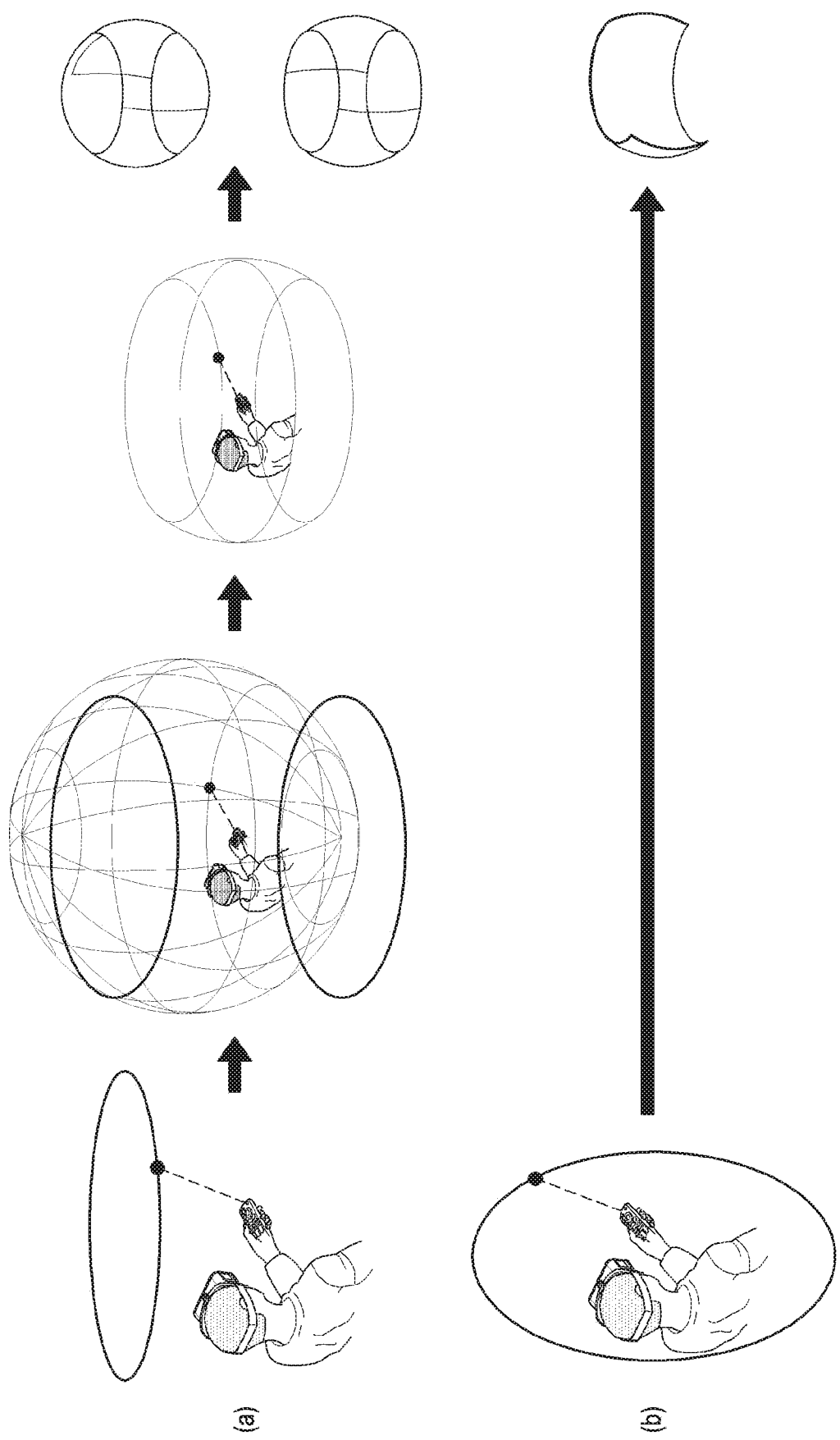

Referring to FIG. 27, to optimize content visualization, the user may cut a non-used region. For example, as shown in FIG. 27(*a*), the user may draw a large circle on a top or bottom region by using a pointer in a 360-degree view to cut the region, in which when the user draws a large circle on the bottom region, a 360-degree view without the bottom is displayed, and when the user draws a large circle on both the top region and the bottom region, switch is made to a 360-degree cylinder view mode. As shown in FIG. 27(*b*), in a 180-degree view, when the user draws a circle for halving a sphere, switch is made to a 180-degree hemisphere view mode.

Figure 28:
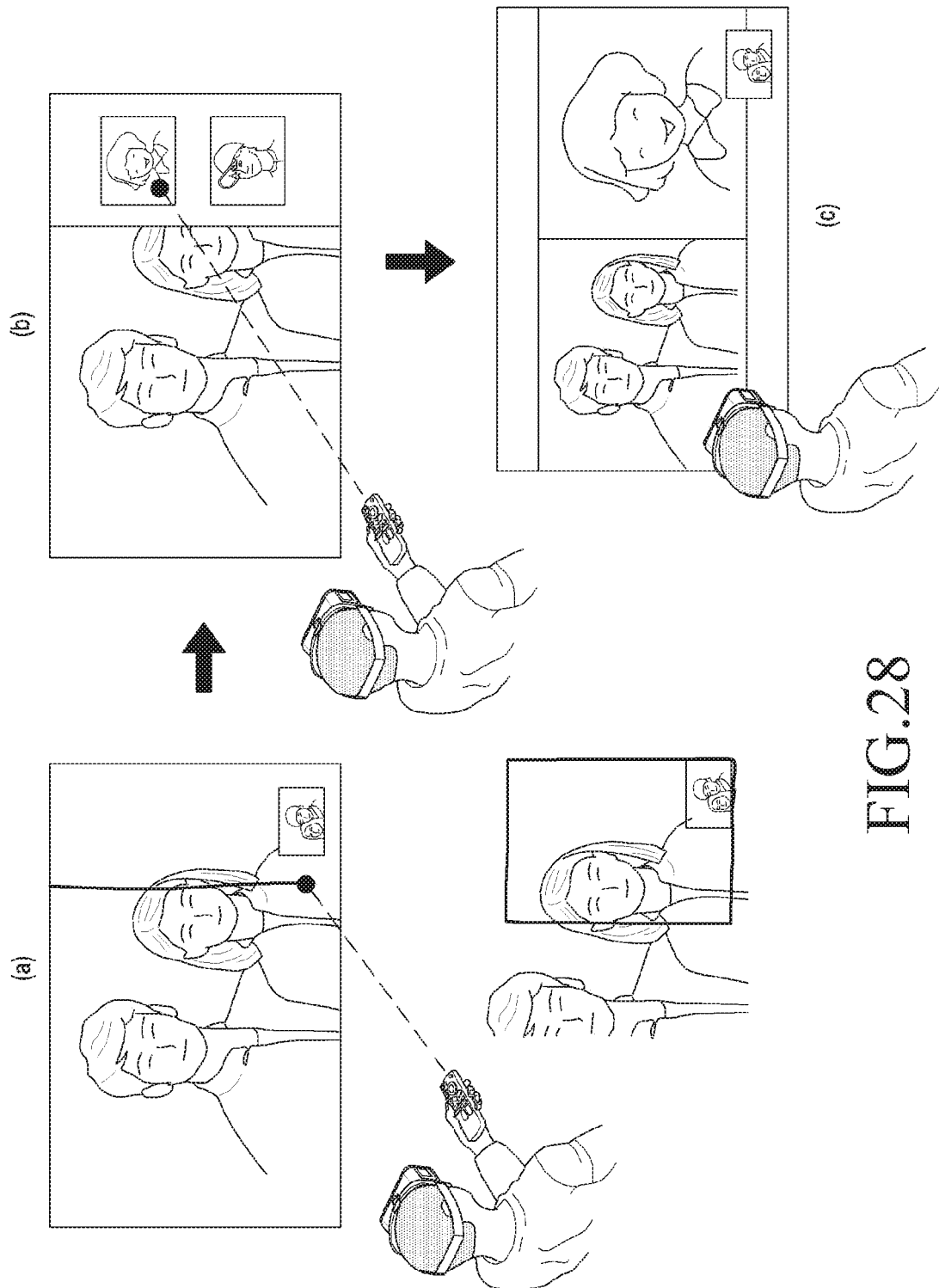

Referring to FIG. 28, the user may separate the screen or create a new window by using a pointer to call an additional conversation partner during a video conversation as in FIG. 28(*a*), and contact or information may be displayed on the separated screen or the created window as in FIG. 28(*b*). In this case, some user-preset contact or information may be preferentially displayed or contact numbers or information belonging to the same group as a conversation partner of the current video conversation may be preferentially displayed. Thereafter, by selecting one of the contact information displayed on the separated screen or the created window, the user may induce a person corresponding to the selected contact information to join the current video conversation, as in FIG. 28(c).

Figure 29A:
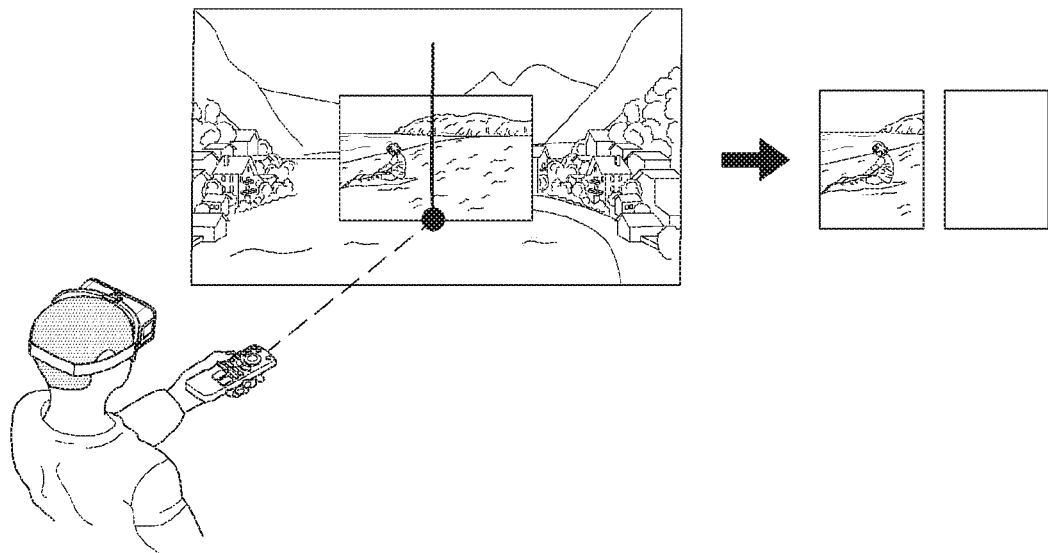
Figure 29B:
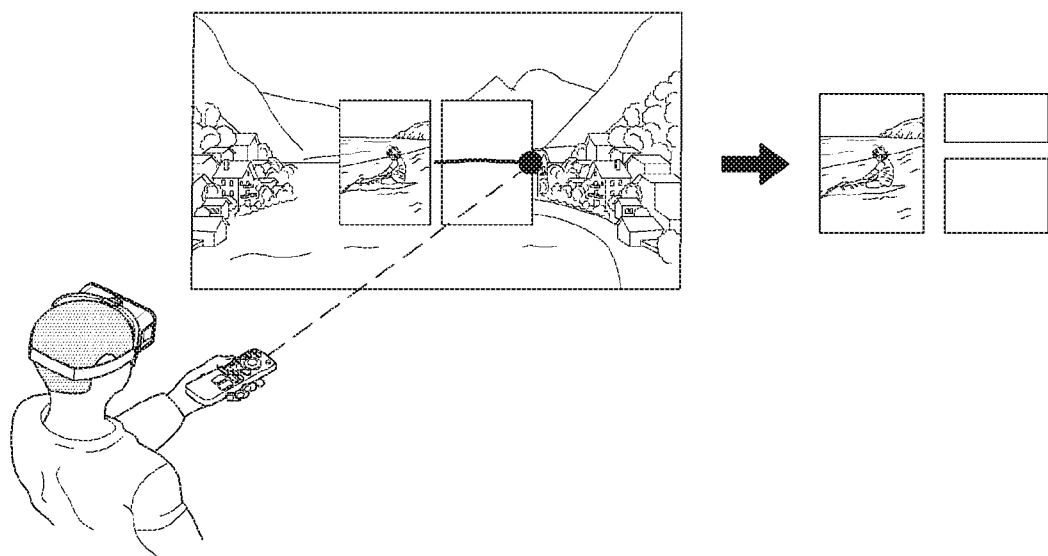
Figure 29C:
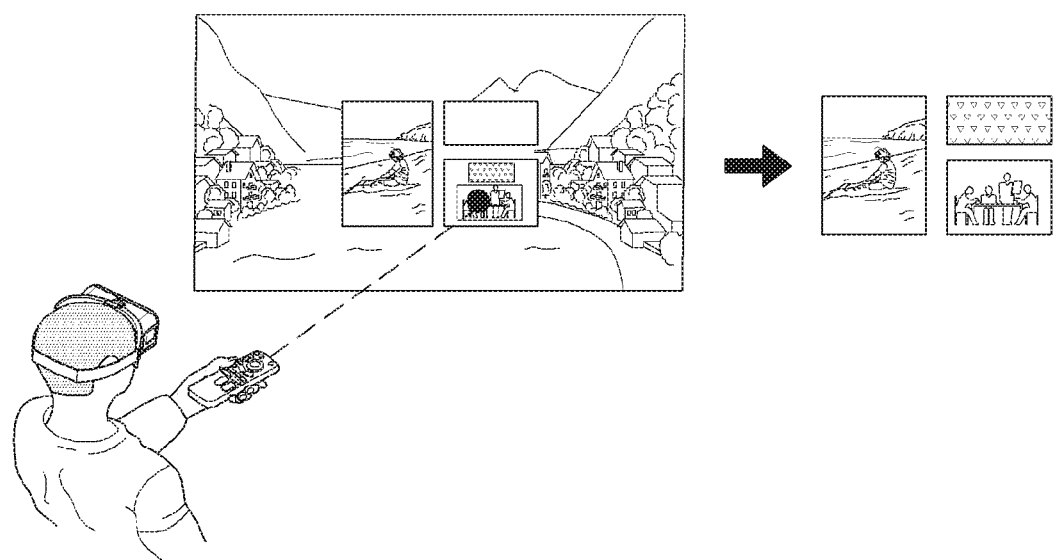

FIGS. 29a-29c illustrates an example of editing a picture by using a pointer, according to the disclosure. Referring to FIGS. 29a-29c, when one picture is displayed on a screen, the user may divide the picture by using a pointer displayed on a 360-degree screen through the method, etc., shown in FIGS. 1 through 6 as in FIG. 29a, divide a window created by the division into two pieces as in FIG. 29b, and select and display new pictures on the two pieces, respectively, as in FIG. 29c.

Although not shown in FIGS. 29a-29c, the user may divide the picture displayed on the screen and draw a gesture for deletion on a region created by the division to delete the region.

Figure 30:
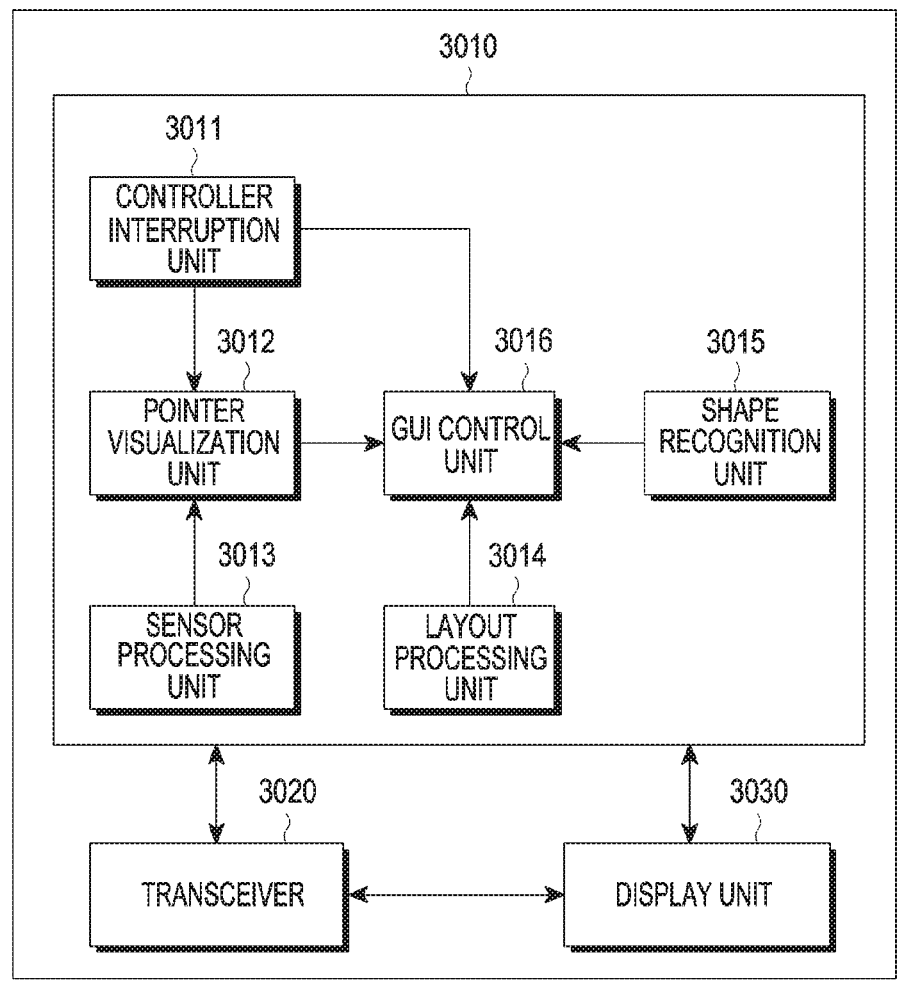
FIG. 30 is a block diagram of an electronic device for editing and displaying a screen by using a pointer, according to the disclosure.

FIG. 30 is a block diagram of an electronic device for editing and displaying a screen by using a pointer, according to the disclosure.

Referring to FIG. 30, an electronic device according to the disclosure may include a controller 3010, a transceiver 3020, and a display unit 3030.

The transceiver 3020 may transmit and receive signals for editing and displaying a screen according to the disclosure under control of the controller 3010.

The controller 3010 may perform a series of control operations for implementing screen editing and displaying according to the disclosure, and may include a controller interruption unit 3011, a pointer visualization unit 3012, a sensor processing unit 3013, a layout processing unit 3014, a shape recognition unit 3015, and a graphic user interface (GUI) control unit 3016.

The controller interruption unit 3011 may provide an event triggered from one or more controller or wearable device. The event may include overall operations for screen editing and displaying according to the disclosure.

The pointer visualization unit 3012 may perform an operation for displaying a pointer on a screen based on a type of the screen.

The sensor processing unit 3013 may provide sensor values received from positioning sensors to visualize the pointer on the screen. The sensor may be a game controller, a TV controller, a VR controller, or a mobile device like a smart phone.

The layout processing unit 3014 may organize a layout on a screen to manage layers, arrangement, and positions for contents on the screen.

The shape recognition unit 3015 may perform a recognition solution for recognizing a shape drawn by a user.

The GUI controller unit 3016 may provide a user interface solution based on various operating systems.

The display unit 3030 may display the screen based on the series of control operations of the controller 3010.

Figure 31:
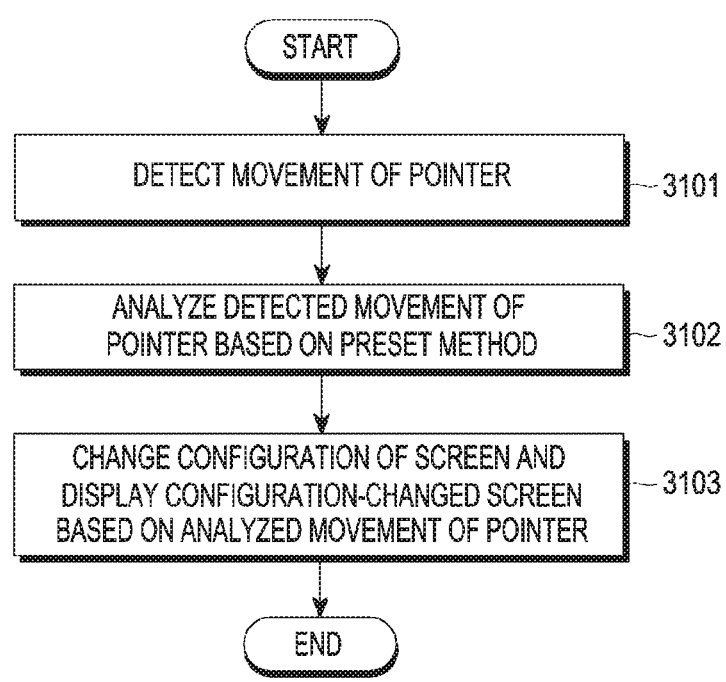
FIG. 31 is a flowchart showing an operation of an electronic device for editing and displaying a screen by using a pointer, according to the disclosure.

FIG. 31 is a flowchart showing an operation of an electronic device for editing and displaying a screen by using a pointer, according to the disclosure.

Referring to FIG. 31, the electronic device may detect a movement of a pointer on a screen in a state where an application for a VR service is executed, in operation 3101, and analyze the detected movement of the pointer based on a preset screen display method according to the above-described embodiments of the disclosure in operation 3102. The electronic device may change a configuration of the screen and display the configuration-changed screen based on the analyzed movement of the pointer in operation 3103.

As used herein, the term "unit" may mean, for example, a unit including one of or a combination of two or more of hardware, software, and firmware. The "unit" may be interchangeably used with a unit, a logic, a logical block, a component, or a circuit. The "unit" may be a minimum unit or a portion of an integrated component. The "unit" may be implemented mechanically or electronically. For example, the "unit" may include at least one of an application-specific integrated circuit (ASIC) chip, field-programmable gate arrays (FPGAs), and a programmable-logic device performing certain operations already known or to be developed.

At least a part of an apparatus (e.g., modules or functions thereof) or a method (e.g., operations) according to various embodiments may be implemented with a command stored in a computer-readable storage medium in the form of a programming module. When the instructions are executed by one or more processors (for example, the processor), the one or more processors may perform functions corresponding to the instructions. The computer-readable storage medium may be, for example, a memory.

The computer-readable recording medium includes a hard disk, floppy disk, or magnetic media (e.g., a magnetic tape), optical media (e.g., compact disc read only memory (CD-ROM)), digital versatile disc (DVD), magneto-optical media (e.g., floptical disk), a hardware device (e.g., ROM, RAM, flash memory, etc.), and so forth. Further, the program instructions may include a machine language code created by a compiler and a high-level language code executable by a computer using an interpreter. The foregoing hardware device may be configured to be operated as at least one software module to perform an operation of the present disclosure, or vice versa.

Modules or programming modules according to various embodiments of the present disclosure may include one or more of the foregoing elements, have some of the foregoing elements omitted, or further include additional other elements. Operations performed by the modules, the programming modules or other elements according to various embodiments may be executed in a sequential, parallel, repetitive, or heuristic manner. Also, some of the operations may be executed in different order or omitted, or may have additional different operations.

According to various embodiments, a storage medium having stored therein instructions which cause, when executed by at least one processor, the at least one processor to perform at least one operation according to the disclosure.

The embodiments disclosed in the present specification and drawings have been provided to easily describe the present disclosure and to help understanding of the present disclosure, and are not intended to limit the scope of the present disclosure. Therefore, it should be construed that the scope of various embodiments of the present disclosure includes any change or other various embodiments based on the technical spirit of the present disclosure as well as the embodiments described herein.

The invention claimed is:

1. A method for controlling a screen for a virtual reality (VR) service in an electronic device, the method comprising:
displaying a 360 degree screen for the VR service, wherein the 360 degree screen includes at least one window;
displaying a pointer positioned on the 360 degree screen for the VR service;
detecting a movement of the pointer on the 360 degree screen for the VR service;
analyzing a trail of the movement of the pointer;

changing the 360 degree screen for the VR service based on the trail of the movement of the pointer; and
displaying the changed 360 degree screen for the VR service,
wherein changing the 360 degree screen for the VR service based on the trail of the movement of the pointer comprises at least one of:
generating a new window having a shape based on the trail of the movement of the pointer,
deleting a part of the at least one window based on the trail of the movement of the pointer, or
dividing a window of the at least one window to at least two windows based on the trail of the movement of the pointer.

2. The method of claim 1, wherein the displaying comprises:
in response to the trail of the movement of the pointer being analyzed as a plane figure in a polygonal shape, generating and displaying the new window in the polygonal shape.

3. The method of claim 1, wherein the displaying comprises:
in response to the trail of the movement of the pointer being analyzed as a movement for deleting the part of the at least one window displayed on the 360 degree screen, deleting the part of the at least one window displayed on the 360 degree screen.

4. The method of claim 1, wherein the displaying comprises:
in response to the trail of the movement of the pointer being analyzed as a movement for dividing the window of the at least one window displayed on the 360 degree screen, dividing the window displayed on the 360 degree screen into two or four windows based on the trail of the movement of the pointer and displaying the two or four windows.

5. The method of claim 1, wherein the displaying further comprises:
in response to the trail of the movement of the pointer being analyzed as a region for selecting a part of the at least one window displayed on the 360 degree screen, displaying on the 360 degree screen that the part of the at least one window positioned in the region is selected.

6. The method of claim 5, wherein the displaying further comprises:
in response to the trail of the movement of the pointer being analyzed as a movement for changing a size of the selected part of the at least one window, changing the size of the selected part of the at least one window and displaying the size-changed part of the at least one window.

7. The method of claim 5, wherein the displaying further comprises:
in response to the trail of the movement of the pointer being analyzed as a movement for changing a position of the selected part of the at least one window, changing the position of the selected part of the at least one window and displaying the position-changed part of the at least one window.

8. An electronic device for controlling a screen for a virtual reality (VR) service, the electronic device comprising:
a display; and
a controller configured to:
display a 360 degree screen for the VR service, wherein the 360 degree screen includes at least one window,
display a pointer positioned on the 360 degree screen for the VR service,
detect a movement of the pointer on the 360 degree screen for the VR service,
analyze a trail of the movement of the pointer,
change the 360 degree screen for the VR service based on the trail of the movement of the pointer, and
display the changed 360 degree screen for the VR service,
wherein to change the 360 degree screen for the VR service based on the trail of the movement of the pointer, the controller is configured to at least one of:
generate a new window having a shape based on the trail of the movement of the pointer,
delete a part of the at least one window based on the trail of the movement of the pointer, or
divide a window of the at least one window to at least two windows based on the trail of the movement of the pointer.

9. The electronic device of claim 8, wherein the controller is configured to:
in response to the trail of the movement of the pointer being analyzed as a plane figure in a polygonal shape, generate and display the new window in the polygonal shape.

10. The electronic device of claim 8, wherein the controller is configured to:
in response to the trail of the movement of the pointer being analyzed as a movement for deleting the part of the at least one window displayed on the 360 degree screen, delete the part of the at least one window displayed on the 360 degree screen.

11. The electronic device of claim 8, wherein the controller is configured to:
in response to the trail of the movement of the pointer being analyzed as a movement for dividing the window of the at least one window displayed on the screen, divide the window displayed on the screen into two or four windows based on the trail of the movement of the pointer and display the two or four windows.

12. The electronic device of claim 8, wherein the controller is further configured to:
in response to the trail of the movement of the pointer being analyzed as a region for selecting a part of the at least one window displayed on the 360 degree screen, display on the 360 degree screen that the part of the at least one window positioned in the region is selected.

13. The electronic device of claim 12, wherein the controller is further configured to:
in response to the trail of the movement of the pointer being analyzed as a movement for changing a size of the selected part of the at least one window, change the size of the selected part of the at least one window and display the size-changed part of the at least one window.

14. The electronic device of claim 12, wherein the controller is further configured to:
in response to the trail of the movement of the pointer being analyzed as a movement for changing a position of the selected part of the at least one window, change the position of the selected part of the at least one window and display the position-changed part of the at least one window.

* * * * *